(12) United States Patent
Hiasa

(10) Patent No.: US 11,837,945 B2
(45) Date of Patent: Dec. 5, 2023

(54) INTEGRATED CIRCUIT

(71) Applicant: FUJI ELECTRIC CO., LTD., Kawasaki (JP)

(72) Inventor: Nobuyuki Hiasa, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 134 days.

(21) Appl. No.: 17/585,296

(22) Filed: Jan. 26, 2022

(65) Prior Publication Data

US 2022/0311322 A1    Sep. 29, 2022

(30) Foreign Application Priority Data

Mar. 29, 2021   (JP) .................................. 2021-055806

(51) Int. Cl.
*H02M 3/335*      (2006.01)
*H02M 1/08*       (2006.01)
(Continued)

(52) U.S. Cl.
CPC .............. *H02M 1/08* (2013.01); *H02M 1/32* (2013.01); *H02M 1/4225* (2013.01); *H02M 3/158* (2013.01); *H02M 3/33507* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10;
(Continued)

(56) References Cited

U.S. PATENT DOCUMENTS

| 8,625,311 B2* | 1/2014 | Hosotani ............. H02M 3/3376 363/21.04 |
| 9,935,559 B2* | 4/2018 | Kong ................. H02M 3/33592 |
| 2018/0041129 A1* | 2/2018 | Sugahara ................ H02M 1/08 |

FOREIGN PATENT DOCUMENTS

| JP | 2012-105424 A | 5/2012 |
| JP | 2014-082924 A | 5/2014 |

(Continued)

*Primary Examiner* — Jeffrey A Gblende
(74) *Attorney, Agent, or Firm* — Rabin & Berdo, P.C.

(57) ABSTRACT

An integrated circuit for a power supply circuit that includes a state-indicating circuit, which is a first or second circuit when the power supply circuit is of a non-isolated or isolated type, as the case may be. The integrated circuit including a voltage generation circuit that generates, at a first terminal, a voltage that is (1) lower than a first level, when the first circuit is coupled to the first terminal, (2) higher than a second level, when the second circuit is coupled to the first terminal, and (3) higher than the first level and lower than the second level, when no state-indicating circuit is coupled to the first terminal, and a determination circuit that determines that the power supply circuit is of the non-isolated or isolated type, when the voltage at the first terminal is lower or higher than the second level, as the case may be.

8 Claims, 14 Drawing Sheets

(51) Int. Cl.
*H02M 3/158* (2006.01)
*H02M 1/42* (2007.01)
*H02M 1/32* (2007.01)

(58) Field of Classification Search
CPC ........ H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H05B 39/048; B23K 11/24; H04B 2215/069
See application file for complete search history.

(56) References Cited

FOREIGN PATENT DOCUMENTS

| JP | 2019-122240 A | 7/2019 |
| WO | 2018/207880 A1 | 11/2018 |
| WO | 2020/213399 A1 | 10/2020 |

* cited by examiner

INTEGRATED CIRCUIT

CROSS-REFERENCE TO RELATED APPLICATION

The present application claims priority pursuant to 35 U.S.C. § 119 from Japanese patent application number 2021-055806 filed on Mar. 29, 2021, the entire disclosure of which is hereby incorporated by reference herein.

BACKGROUND

Technical Field

The present disclosure relates to an integrated circuit.

Description of the Related Art

An integrated circuits that control a power supply circuit generally switches a power transistor such that the power supply circuit generates an output voltage of a target level from an input voltage inputted thereto (see Japanese Patent Application Publication Nos. 2014-82924, 2012-105424 and 2019-122240, and International Publication Nos. WO2018/207880 and WO2020/213399, for example).

Incidentally, some integrated circuits are compatible with both non-isolated and isolated power supply circuits, and include a determination circuit that determines whether such an integrated circuit is used in a non-isolated power supply circuit or an isolated power supply circuit based on the state of a terminal thereof. However, if, for example, a failure in coupling to the terminal occurs among failures in the process of manufacturing power supply circuits, the determination circuit may not operate properly.

SUMMARY

An aspect of an embodiment of the present disclosure is an integrated circuit for a power supply circuit that generates an output voltage from an input voltage inputted thereto, the power supply circuit being of a non-isolated type or an isolated type, the power supply circuit including an inductor configured to receive the input voltage, a power transistor configured to control an inductor current flowing through the inductor, and a state-indicating circuit that generates an output to indicate whether the power supply circuit is of the non-isolated type or the isolated type, the state-indicating circuit being a first circuit when the power supply circuit is of the non-isolated type, and a second circuit when the power supply circuit is of the isolated type, the integrated circuit being configured to switch the power transistor, based on the inductor current and the output voltage, the integrated circuit comprising: a first terminal configured to be coupled to the state-indicating circuit, a state of the first terminal being a first state when the state-indicating circuit coupled to the first terminal is the first circuit, and a second state when the state-indicating circuit coupled to the first terminal is the second circuit, and a third state when no state-indicating circuit is coupled to the first terminal; a voltage generation circuit configured to generate, at the first terminal, a voltage that is lower than a first level in correspondence to the output voltage, when the first terminal is in the first state, higher than a second level, when the first terminal is in the second state, and higher than the first level and lower than the second level, when the first terminal is in the third state; a determination circuit configured to determine that the power supply circuit is of the non-isolated type, when the voltage at the first terminal is lower than the second level, and determine that the power supply circuit is of the isolated type, when the voltage at the first terminal is higher than the second level; and a driver circuit configured to drive the power transistor in response to a result of determination of the determination circuit.

BRIEF DESCRIPTION OF THE DRAWINGS

FIG. 2 is a diagram illustrating an example of a voltage generation circuit 33a.

FIG. 3C is a diagram illustrating an example of voltage generated by a voltage generation circuit 33a.

DETAILED DESCRIPTION

At least following matters will become apparent from the descriptions of the present specification and the accompanying drawings.

Embodiments

<<<Configuration of Switching Control IC 10>>>

Figure 1:
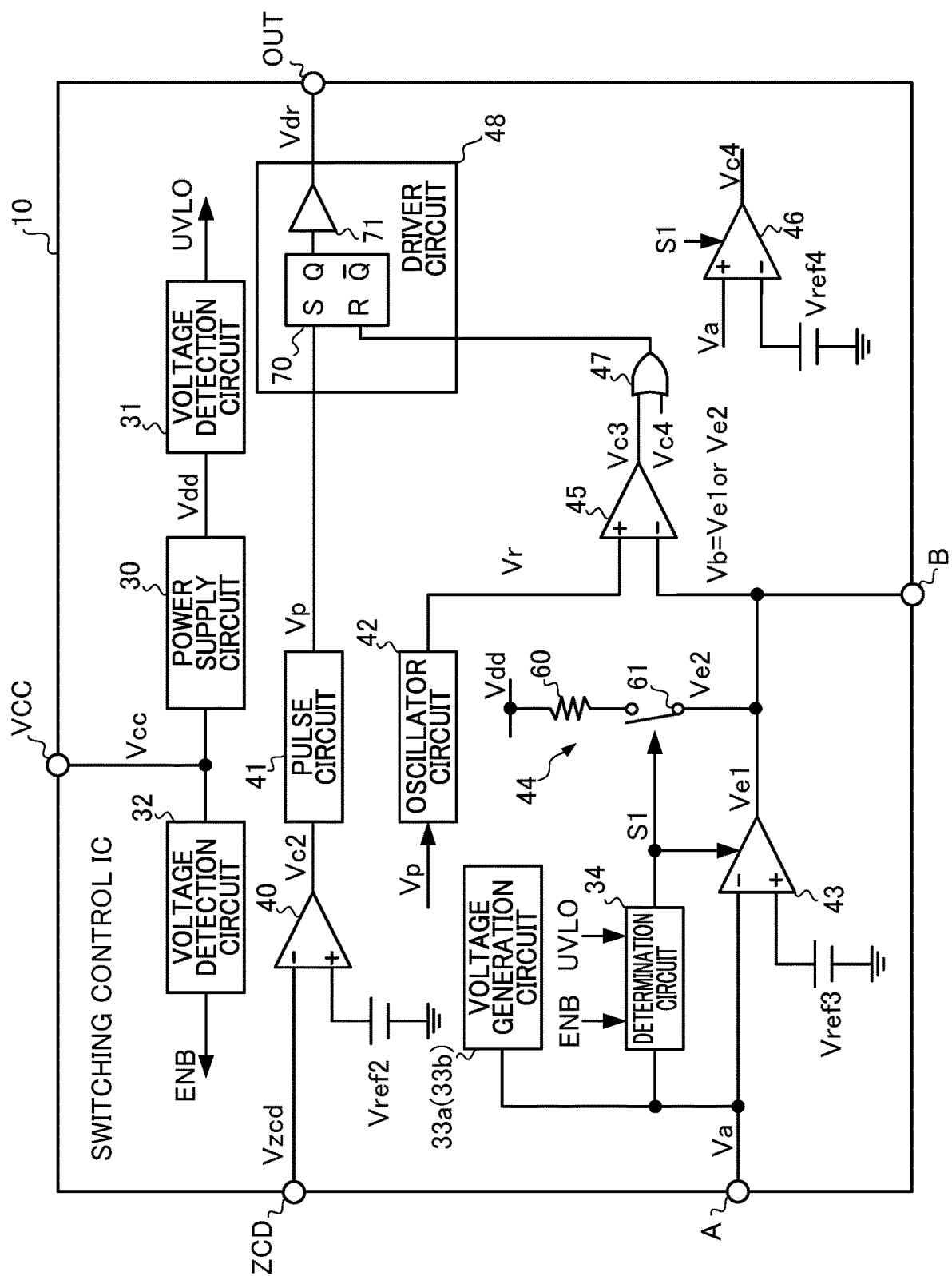
FIG. 1 is a diagram illustrating an example of a switching control integrated circuit (IC) 10.

FIG. 1 is a diagram illustrating a configuration of a switching control IC 10 which is an embodiment of the present disclosure. The switching control IC 10 is an integrated circuit that determines whether the switching control IC 10 is used in a non-isolated power supply circuit or an isolated power supply circuit, and controls operation of the power supply circuit according to the result of the determination. Specifically, when used in a non-isolated switching power supply circuit, the switching control IC 10 operates based on a feedback voltage corresponding to the output voltage of the non-isolated switching power supply circuit. On the other hand, when used in an isolated switching power supply circuit, the switching control IC 10 operates based on a current indicating an error from a target level of the output voltage of the isolated switching power supply circuit.

The switching control IC 10 has terminals VCC, ZCD, A, B, and OUT. Note that the switching control IC 10 is provided with, for example, a GND terminal to receive a ground voltage and other terminals, but they are omitted here for convenience.

The terminal VCC is a terminal to receive a power supply voltage Vcc for operating the switching control IC 10.

The terminal ZCD is a terminal for detecting an inductor current I0b the power supply circuit that uses the switching control IC 10.

The terminal A is a terminal to receive a voltage for determining whether the power supply circuit that uses the switching control IC 10 is a non-isolated type or an isolated type. When the switching control IC 10 is used in a non-isolated power supply circuit, the feedback voltage corresponding to the output voltage of the power supply circuit is applied to the terminal A. On the other hand, when the switching control IC 10 is used in an isolated power supply circuit, voltage divider resistors that divide the power supply voltage Vcc are coupled to the terminal A. Note that the voltage at the terminal A will be referred to as voltage Va, and the terminal A corresponds to a "first terminal".

The terminal B is a terminal to which phase compensation elements are coupled when the switching control IC 10 is used in a non-isolated power supply circuit, and to which a phototransistor is coupled when the switching control IC 10 is used in an isolated power supply circuit. Note that the voltage at the terminal B will be referred to as voltage Vb, and the terminal B corresponds to a "second terminal".

The terminal OUT is a terminal to receive a drive signal Vdr for controlling the switching of a switching device.

The switching control IC 10 includes a power supply circuit 30, voltage detection circuits 31 and 32, a voltage generation circuit 33a, a determination circuit 34, comparators 40 and 45, a pulse circuit 41, an oscillator circuit 42, an error amplifier circuit 43, an error voltage output circuit 44, a comparator 46, an OR element 47, and a driver circuit 48.

The power supply circuit 30 is a circuit (e.g., series regulator) that generates a power supply voltage Vdd for operating circuits inside the switching control IC 10, based on the power supply voltage Vcc applied from the outside of the switching control IC 10. Note that, among the circuits included in the switching control IC 10, the circuits to which the power supply voltage Vdd is supplied are other than the power supply circuit 30 and a buffer circuit 71 (described later) in the driver circuit 48. In an embodiment of the present disclosure, the buffer circuit 71 in the driver circuit 48 operates based on the power supply voltage Vcc.

The voltage detection circuit 31 detects whether the level of the power supply voltage Vdd has reached a predetermined level X. Note that the "predetermined level X" is a level indicating that the power supply voltage Vdd has risen, and is, for example, 4.5 V when the target level of the power supply voltage Vdd is 5 V. The voltage detection circuit 31 also changes the level of a signal UVLO from a high level (hereinafter, referred to as high or high level) to a low level (hereinafter, referred to as low or low level), in response to the level of the power supply voltage Vdd having risen and reached the predetermined level X. It is assumed that, in an embodiment of the present disclosure, the level of the power supply voltage Vcc when the power supply voltage Vdd reaches the predetermined level X is a "predetermined level Vt1".

The voltage detection circuit 32 detects whether the level of the power supply voltage Vcc has reached a "predetermined level Vt2" at which the circuits in the switching control IC 10 starts operating. The voltage detection circuit 32 changes the level of a signal ENB from high to low in response to the level of the power supply voltage Vcc having risen and reached the predetermined level Vt2. Note that, in an embodiment of the present disclosure, the above-mentioned level Vt1 is lower than the predetermined level Vt2. Thus, in response to the power supply voltage Vcc rising from zero, the voltage detection circuit 31 firstly changes the signal UVLO to low, and then the voltage detection circuit 32 changes the signal ENB to low. Note that, in an embodiment of the present disclosure, the signals UVLO and ENB are inputted to circuits in the switching control IC 10, although this is omitted in FIG. 1.

Figure 2:
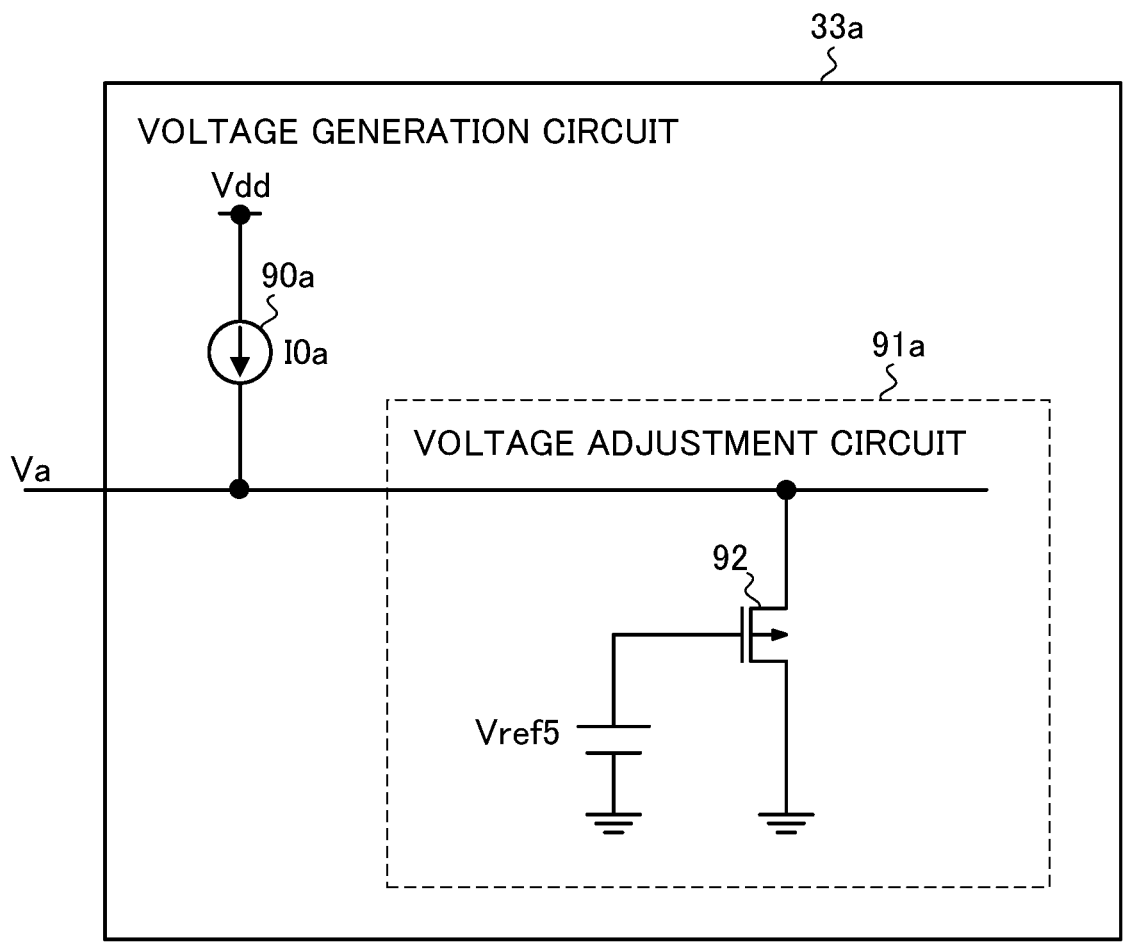

The voltage generation circuit 33a generates the voltage Va that is in accordance with an external circuit (i.e., a "state-indicating circuit") coupled to the terminal A. As illustrated in FIG. 2, the voltage generation circuit 33a includes a constant current source 90a and a voltage adjustment circuit 91a. The constant current source 90a supplies a constant current I0a to the terminal A.

The voltage adjustment circuit 91a adjusts the voltage Va at the terminal A based on the state of the terminal A and the constant current I0a supplied to the terminal A. The voltage adjustment circuit 91a includes a P-channel metal-oxide-semiconductor (PMOS) transistor 92 having a gate electrode to which a reference voltage Vref5 is applied, a source electrode to which the voltage Va is applied, and a drain electrode to which the ground voltage is applied.

Here, in the state where the external circuit is coupled to the terminal A, and when the voltage Va is low and the difference between the voltage Va and the reference voltage Vref5 is less than a threshold voltage Vth of the PMOS transistor 92, the PMOS transistor 92 is turned off. In this case, the constant current I0a flows through the terminal A to the external circuit coupled thereto. Although details will be described later, the constant current I0a is set at a value that is such a small value (e.g., 2 µA) that the voltage Va at the terminal A does not substantially change even when the constant current I0a flows to the outside. Thus, in such a case, the voltage adjustment circuit 91a causes the voltage Va at the terminal A to be at a value that is determined based on the circuit coupled to the terminal A.

Meanwhile, in the state where the external circuit is coupled to the terminal A, and when the voltage Va is high and the difference between the voltage Va and the reference voltage Vref5 is larger than the threshold voltage Vth, the PMOS transistor 92 is turned on. Here, the size of the PMOS transistor 92 is selected, so as to be able to pass a current slightly larger than the constant current I0a (e.g., 10 µA), when it is turned on. In response to a large current (e.g., several tens of µA) flowing to the terminal A from the circuit coupled to the terminal A in such a state as above, the voltage Va rises according to the current flowing in from the terminal A. Thus, in such a case, the voltage adjustment circuit 91a raises the voltage Va at the terminal A together with the constant current source 90a.

Furthermore, in a state where the external circuit is not coupled to the terminal A (i.e., a state where the terminal A and the external circuit are open with respect to each other), the constant current I0a flows to the PMOS transistor 92 without flowing to the outside through the terminal A. In this case, the voltage Va results in a drain-source voltage Vds of the PMOS transistor 92 generated in response to the constant current I0a flowing to the PMOS transistor 92. That is, the voltage adjustment circuit 91a causes the voltage Va at the terminal A to be at a voltage corresponding to the constant current I0a. Note that the PMOS transistor 92 corresponds to a "transistor".

In the following, specific external circuits will be given, and what type of the voltage Va is generated by the voltage generation circuit 33a when each of the external circuits is coupled to the terminal A will be described.

<Case where Circuit Used in Non-Isolated Power Supply Circuit is Coupled Thereto>

Figure 3A:
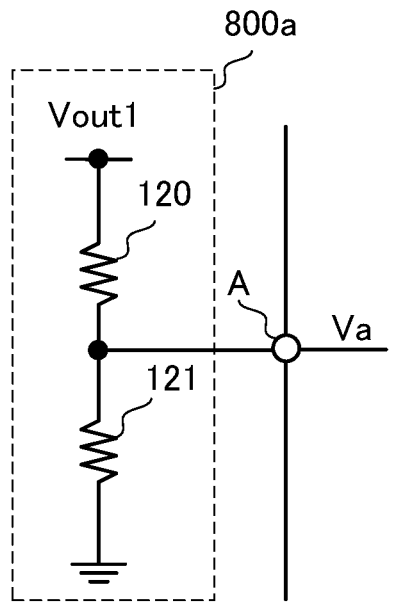
FIG. 3A is a diagram of a first state in which a voltage divider circuit 800a is coupled to a terminal A.

First, as illustrated in FIG. 3A, a first state in which a voltage divider circuit 800a is coupled, as the external circuit, to the terminal A will be described. Here, the voltage divider circuit 800a includes resistors 120 and 121, and generates a divided voltage obtained by dividing an output voltage Vout1 of a non-isolated power supply circuit. Here, the output voltage Vout1 is controlled so as to be at a predetermined level (e.g., 400 V). Accordingly, by adjusting the voltage division ratio of the resistors 120 and 121, the divided voltage can be made at a level at which the PMOS transistor 92 is turned off.

In an embodiment of the present disclosure, the level of the divided voltage is set below a first level V1 given in FIG. 3C to ensure that the PMOS transistor 92 will be turned off when the circuit in FIG. 3A to be used in the non-isolated power supply circuit is coupled to the terminal A. Note that the first level V1 is the level of the divided voltage at the voltage divider circuit 800a when the output voltage Vout1 is an overvoltage. Although details will be described later, in the non-isolated power supply circuit, the output voltage Vout1 is controlled so as not to exceed an overvoltage.

When such a voltage divider circuit 800a as above is coupled to the terminal A, the PMOS transistor 92 is turned off, and thus the constant current I0a flows through the resistor 121. However, in an embodiment of the present disclosure, a current of a sufficiently small value is used as the constant current I0a, for example. Accordingly, when the voltage divider circuit 800a in FIG. 3A is coupled to the terminal A, the voltage Va at the terminal A becomes substantially equal to the divided voltage (i.e., a feedback voltage obtained by dividing the output voltage Vout1). Note that the voltage divider circuit 800a corresponds to "first circuit".

<Case where Circuit Used in Isolated Power Supply Circuit is Coupled Thereto>

Figure 3B:
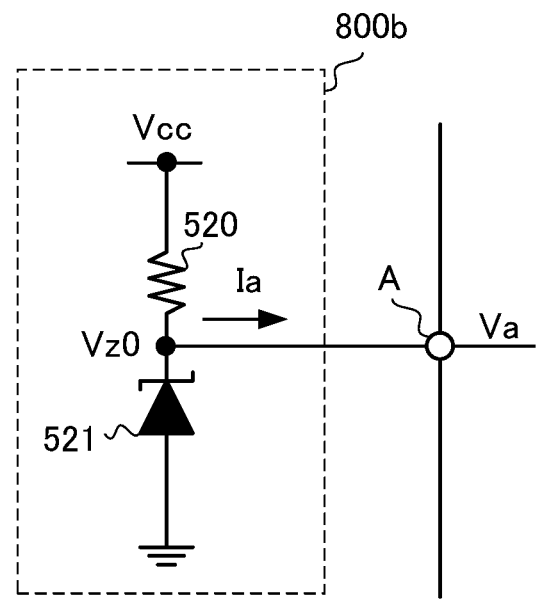
FIG. 3B is a diagram of a second state in which a circuit 800b is coupled to a terminal A.

Next, as illustrated in FIG. 3B, a second state in which a circuit 800b is coupled, as the external circuit, to the terminal A will be described. Here, the circuit 800b includes a resistor 520 and a Zener diode 521, and generates a breakdown voltage Vz0 of the Zener diode 521 at the terminal A. Here, in an embodiment of the present disclosure, the level of the breakdown voltage Vz0 is a level at which the PMOS transistor 92 will be reliably turned on when the circuit 800b is coupled to the terminal A. Moreover, in an embodiment of the present disclosure, the resistance value of the resistor 520 is selected such that a current Ia flowing into the voltage generation circuit 33a from the circuit 800b through the terminal A can be sufficiently larger than the sink current of the PMOS transistor 92.

Accordingly, when the circuit 800b is coupled to the terminal A, the current Ia flows into the voltage generation circuit 33a. As a result, the voltage at a node at which the constant current source 90a and the source electrode of the PMOS transistor 92 are coupled (i.e., the voltage Va at the terminal A) rises substantially to the level of the power supply voltage Vdd. Thus, as illustrated in FIG. 3C, when the circuit 800b is coupled to the terminal A, the level of the voltage at the terminal A exceeds a second level V2 that is for the later-described determination circuit 34 to determine that the switching control IC 10 is used in an isolated power supply circuit.

Note that the circuit 800b corresponds to a "second circuit", and the resistor 520 and the Zener diode 521 correspond to an "element". Also, the breakdown voltage Vz0 corresponds to a "predetermined voltage". In addition, in an embodiment of the present disclosure, the circuit 800b includes the resistor 520 and the Zener diode 521, but may be, for example, a voltage-divider resistor circuit that generates a divided voltage capable of turning on the PMOS transistor 92.

<Case where Circuit Used in Power Supply Circuit is not Coupled Thereto>

In addition, a third state in which the circuit that is supposed to be coupled to the terminal A and the terminal A are open with respect to each other will be described. In this case, the external circuit is not coupled to the terminal A, and thus the constant current I0a flows through the PMOS transistor 92. Accordingly, the voltage adjustment circuit 91a causes the voltage Va to be a voltage corresponding to the constant current I0a. In an embodiment of the present disclosure, the size ratio and the like of the PMOS transistor 92 are set such that, when the constant current I0a flows to the PMOS transistor 92, the voltage at the source electrode of the PMOS transistor (i.e., the voltage Va at the terminal A) is higher than the above-mentioned first level V1 and lower than the above-mentioned second level V2. Thus, although details will be described later, when no external circuit is coupled to the terminal A, the determination circuit 34 can be prevented from erroneously determining that the isolated circuit 800b is coupled to the terminal A (i.e., the switching control IC 10 is used in an isolated power supply circuit).

Figure 4:
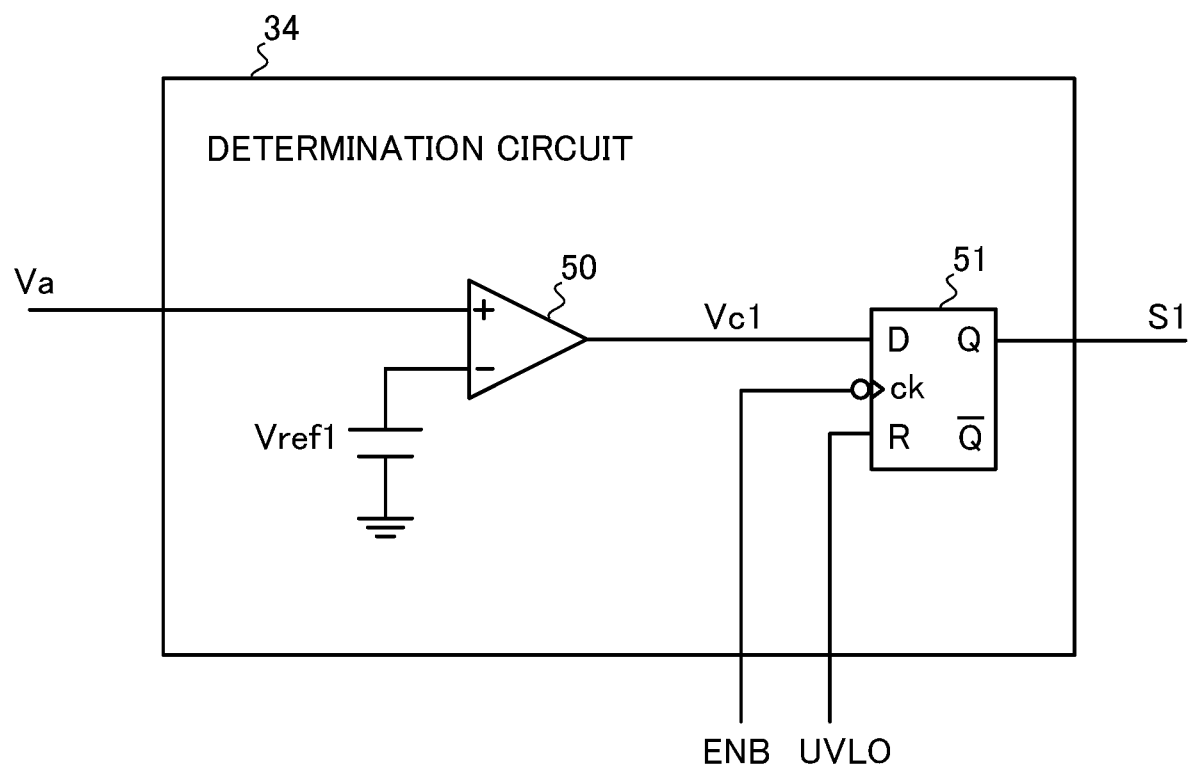
FIG. 4 is a diagram illustrating an example of a determination circuit 34.

The determination circuit 34 determines whether the switching control IC 10 is used in a non-isolated power supply circuit or in an isolated power supply circuit, based on the voltage Va at the terminal A. Specifically, the determination circuit 34 determines that the switching control IC 10 is used in a non-isolated power supply circuit when the voltage Va is lower than a voltage of the second level V2, and determines that the switching control IC 10 is used in an isolated power supply circuit when the voltage Va is higher than a voltage of the second level V2. FIG. 4 is a diagram illustrating an example of the configuration of the determination circuit 34. The determination circuit 34 includes a comparator 50 and a D flip-flop 51.

The comparator 50 compares a reference voltage Vref1 for distinguishing between a non-isolated power supply circuit and an isolated power supply circuit (i.e., a voltage of the second level V2) with the voltage Va. Here, when the switching control IC 10 is used in a non-isolated power supply circuit, a feedback voltage Vfb corresponding to the output voltage thereof is applied to the terminal A. On the other hand, when the switching control IC 10 is used in an isolated power supply circuit, the switching control IC 10 operates without using the voltage Va at the terminal A. Thus, by setting the level of the voltage Va of an isolated power supply circuit outside the range of the voltage Va of a non-isolated power supply circuit (the voltage range in which the feedback voltage Vfb varies), these two types of power supply circuits can be distinguished from each other.

For instance, when the feedback voltage Vfb from a non-isolated power supply circuit varies within a range of 0 to 3 V, the voltage Va for an isolated power supply circuit may be at a predetermined level (e.g., 5.4 V) outside the range of 0 to 3 V, thereby being able to distinguish these two types of power supply circuits based on the voltage Va at the terminal A.

In an embodiment of the present disclosure, in order to distinguish between the voltage range (e.g., 0 to 3 V) of the feedback voltage Vfb from a non-isolated power supply circuit and the voltage Va (e.g., 5.4 V) for an isolated power supply circuit, used is the reference voltage Vref1 (e.g., 4 V), which is higher than the voltage range of the feedback voltage Vfb and lower than the voltage Va for the isolated power supply circuit.

Accordingly, by comparing the reference voltage Vref1 and the voltage Va, the comparator 50 can determine whether the power supply circuit that uses the switching control IC 10 is of a non-isolated type or an isolated type.

The D flip-flop 51 is a circuit that holds the result of the comparison of the comparator 50, in response to startup of the switching control IC 10. The D flip-flop 51 has R input to which the signal UVLO is inputted and the CK input to which the signal ENB is inputted. Thus, in response to the power supply voltage Vcc rising and the voltage detection circuit 31 changing the signal UVLO to low, reset of the D flip-flop 51 is released. Thereafter, in response to the power supply voltage Vcc further rising and the voltage detection circuit 32 changing the signal ENB to low, the result of the comparison of the comparator 50 inputted to the D input is held. Then, the result of the comparison held in the D flip-flop 51 is outputted from the Q output as a signal S1.

Note that, in an embodiment of the present disclosure, a low signal S1 is outputted in response to a determination that the switching control IC 10 is used in a non-isolated power supply circuit, meanwhile, a high signal S1 is outputted in response to a determination that the switching control IC 10 is used in an isolated power supply circuit.

The comparator 40 is a so-called zero current detection circuit, and detects whether an inductor current IL (described later) in the power supply circuit has become zero based on a voltage Vzcd at the terminal ZCD. It is assumed here that "zero" is, for example, a current value (e.g., 0.1 mA) when the inductor current IL is substantially zero. Thus, the comparator 40 compares the voltage Vzcd and a reference voltage Vref2 corresponding to, for example, a current of 0.1 mA, to detect whether the inductor current IL is zero. Note that the comparator 40 changes a signal Vc2 to low in response to detecting that the inductor current IL is zero.

The pulse circuit 41 outputs a high pulse signal Vp in response to detecting that the inductor current IL is zero and the signal Vc2 going low.

The oscillator circuit 42 outputs a ramp wave Vr whose amplitude gradually increases, each time receiving the high pulse signal Vp.

The error amplifier circuit 43 is configured to, in response to a determination that the switching control IC 10 is used in a non-isolated power supply circuit, output an error voltage Ve1 for causing the level of the output voltage of the power supply circuit to be a first target level. Specifically, in response to receiving the low signal S1, the error amplifier circuit 43 amplifies an error between the voltage Va and a predetermined reference voltage Vref3 and outputs a resultant voltage as the error voltage Ve1. Note that the error voltage Ve1 corresponds to a "first error voltage".

On the other hand, in response to receiving the high signal S1, the error amplifier circuit 43 stops outputting the error voltage Ve1. Note that the reference voltage Vref3 is a voltage determined according to the target level of the output voltage Vout1 of the non-isolated power supply circuit. The output of the error voltage Ve1 is stopped, for example, with the output of the error amplifier circuit 43 becoming a high-impedance state. Note that the error amplifier circuit 43 corresponds to a "first error voltage output circuit", and the error voltage Ve1 corresponds to a "first error voltage".

The error voltage output circuit 44 is configured to, in response to a determination that the switching control IC 10 is used in an isolated power supply circuit, output an error voltage Ve2 for causing the level of the output voltage of the power supply circuit to be a second target level, and includes a resistor 60 and a switch 61. Note that although details will be described later, when the switching control IC 10 is used in an isolated power supply circuit, a phototransistor that generates a current corresponding to an error from the target level of the output voltage is coupled to the terminal B. Further, the error voltage output circuit 44 generates the error voltage Ve2 according to the current from the phototransistor.

The switch 61 is provided between the terminal B and the resistor 60 having one end to which the power supply voltage Vdd is applied. The switch 61 coupled in series with the resistor 60 is turned on in response to receiving the high signal S1, and is turned off in response to receiving the low signal S1.

Thus, in response to the switch 61 receiving the high signal S1 and being turned on, the current from the phototransistor (described later) flows through the resistor 60. Then, the error voltage Ve2 corresponding to the error from the target level of the output voltage is outputted from the resistor 60. On the other hand, in response to the switch 61 receiving the low signal S1 and being turned off, the error voltage Ve2 stops being outputted. Note that the error voltage output circuit 44 corresponds to a "second error voltage output circuit", and the error voltage Ve2 corresponds to a "second error voltage".

As such, the error amplifier circuit 43 outputs the error voltage Ve1 in response to receiving the low signal S1, and the error voltage output circuit 44 outputs the error voltage Ve2 in response to receiving the high signal S1. Thus, in an embodiment of the present disclosure, only one of the error amplifier circuit 43 or the error voltage output circuit 44 results in operating and outputting a voltage corresponding to the error in the output voltage. Note that the voltage applied to the terminal B is the voltage Vb, and thus, the voltage Vb is the error voltage Ve1 when the signal S1 is low, meanwhile, the voltage Vb is the error voltage Ve2 when the signal S1 is high.

The comparator 45 compares the magnitude between the voltage Vb at the terminal B and the ramp wave Vr, and outputs a signal Vc3 as the result of the comparison. Here, the voltage Vb is applied to the inverting input terminal of the comparator 45, and the ramp wave Vr is applied to the non-inverting input terminal of the comparator 45. Thus, the signal Vc3 is low when the level of the ramp wave Vr is lower than the level of the voltage Vb, meanwhile, the signal Vc3 is high when the level of the ramp wave Vr is higher than the level of the voltage Vb.

The comparator 46 is a protection circuit that prevents the output voltage Vout1 from becoming an overvoltage. Specifically, when the switching control IC 10 is used in a non-isolated power supply circuit, the comparator 46 causes the later-described driver circuit 48 to stop driving a power transistor (described later) in response to the voltage Va at the terminal A reaching a voltage of the first level V1.

Specifically, the comparator 46 outputs a high signal Vc4 in response to the voltage Va being equal to or higher than a reference voltage Vref4 (i.e., a voltage of the first level V1), and outputs a low signal Vc4 in response to the voltage Va being lower than the reference voltage Vref4.

The OR element 47 outputs a logical OR of the signal Vc3 and the signal Vc4.

The driver circuit 48 turns on the power transistor in response to receiving the pulse signal Vp, and turns off the power transistor in response to receiving a high signal outputted by the OR element 47. Specifically, the driver circuit 48 drives the power transistor based on the error voltage Ve1 when the switching control IC 10 is used in a non-isolated power supply circuit. On the other hand, the driver circuit 48 drives the power transistor based on the error voltage Ve2 when the switching control IC 10 is used in an isolated power supply circuit. The driver circuit 48 includes an SR flip-flop 70 and the buffer circuit 71.

The SR flip-flop 70 has S input to receive the pulse signal Vp, and R input to receive the output of the OR element 47. Accordingly, the Q output of the SR flip-flop 70 goes high, in response to the pulse signal Vp going high. On the other hand, the Q output goes low, in response to receiving a high signal from the OR element 47.

The buffer circuit 71 outputs the drive signal Vdr for driving the switching device, in response to the Q output of the SR flip-flop 70. Specifically, the buffer circuit 71 outputs a high drive signal Vdr in response to the Q output going high, and outputs a low drive signal Vdr in response to the Q output going low.

<<<Example of Non-Isolated Power Supply Circuit>>>

Figure 5:
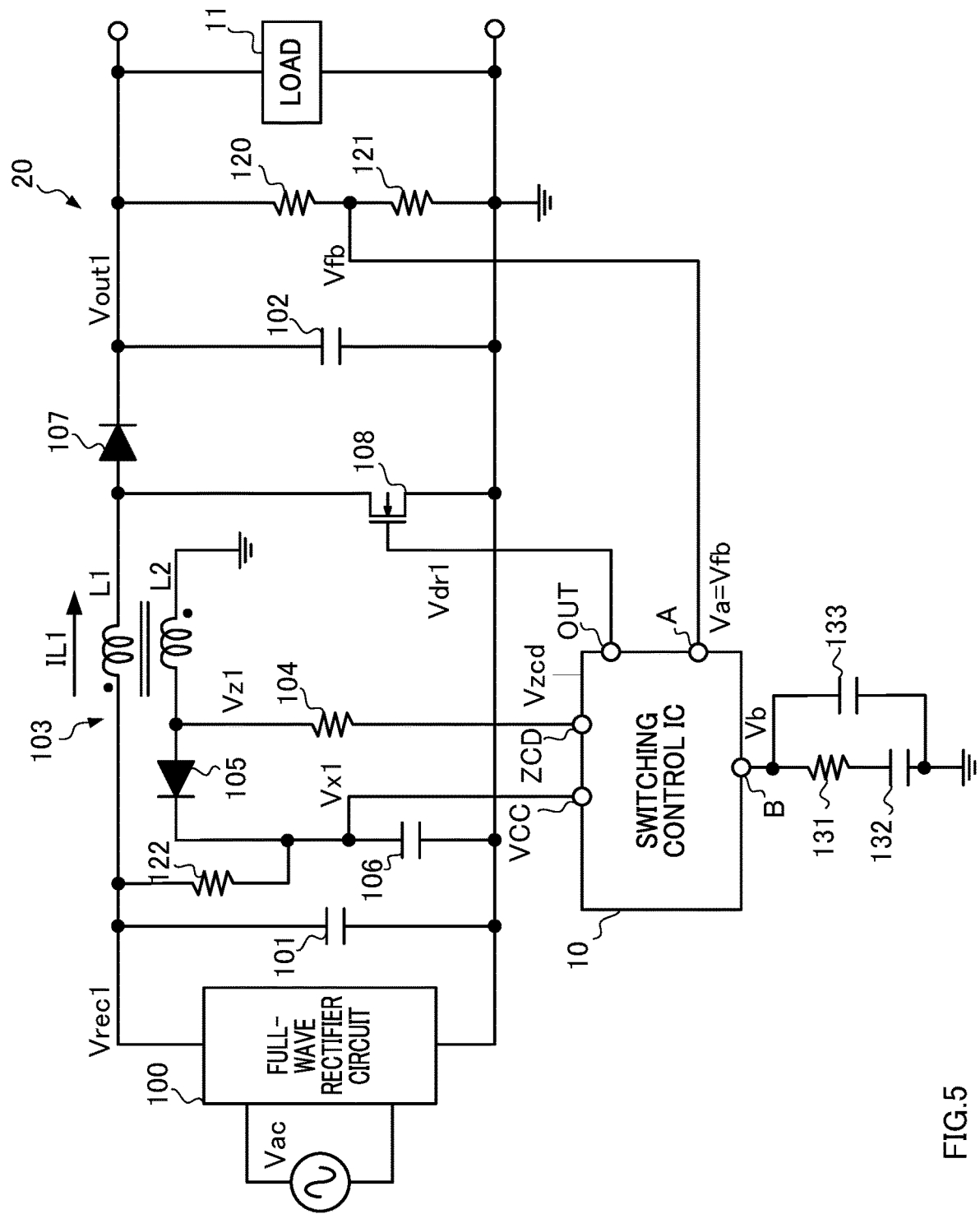
FIG. 5 is a diagram illustrating an example of a non-isolated power supply circuit 20.

FIG. 5 is a diagram illustrating an example of a configuration of a non-isolated power supply circuit 20. The power supply circuit 20 is a boost chopper AC-DC converter that generates the output voltage Vout1 of a target level V1 (e.g., 400 V) at a load 11 from an alternating-current voltage (AC voltage) Vac of a commercial power supply. Note that the load 11 is, for example, an electronic device such as a DC-DC converter, a microcomputer and/or the like. Note that the power supply circuit 20 corresponds to a "first power supply circuit".

The power supply circuit 20 includes a switching control IC 10, a full-wave rectifier circuit 100, capacitors 101, 102, 106, 132, and 133, a transformer 103, resistors 104, 120, 121, 122, and 131, diodes 105 and 107, and an N-channel metal-oxide-semiconductor (NMOS) transistor 108.

The switching control IC 10 is the control IC explained with reference to FIG. 1. The switching control IC 10 controls switching of the NMOS transistor 108 such that the level of the output voltage Vout1 reaches a target level Vo1, while improving the power factor of the power supply circuit 20.

The full-wave rectifier circuit 100 full-wave rectifies the predetermined AC voltage Vac applied thereto, and outputs a resultant voltage as a voltage Vrec1 to the capacitor 101. Note that the AC voltage Vac is a voltage of 100 to 240 V with a frequency of 50 to 60 Hz.

The capacitor 101 smooths the voltage Vrec1, and thus the smoothed voltage Vrec1 is applied to a main coil L1 of the transformer 103. Note that the voltage applied to the main coil L1 (inductor) corresponds to an input voltage.

The transformer 103 has the main coil L1 and an auxiliary coil L2 magnetically coupled to the main coil L1. Here, in an embodiment of the present disclosure, winding of the auxiliary coil L2 is formed such that the voltage generated across the auxiliary coil L2 is opposite in polarity to the voltage generated across the main coil L1.

The resistor 104 is provided between one end of the auxiliary coil L2 and the terminal ZCD. Thus, a voltage Vz1 generated across the auxiliary coil L2 is applied as the voltage Vzcd to the terminal ZCD.

Moreover, the diode 105 and the capacitor 106 are provided between the one end of the auxiliary coil L2 and the ground. Thus, the capacitor 106 is charged by the voltage Vz1. Further, in an embodiment of the present disclosure, a charge voltage Vx1 across the capacitor 106 is supplied as the power supply voltage Vcc of the switching control IC 10.

The capacitor 102 configures a boost chopper circuit together with the main coil L1, the diode 107, and the NMOS transistor 108. Thus, the charge voltage across the capacitor 102 results in the direct-current (DC) output voltage Vout1.

The NMOS transistor 108 is a power transistor for controlling power to the load 11. Note that, in an embodiment of the present disclosure, the NMOS transistor 108 is a metal oxide semiconductor (MOS) transistor but it is not limited thereto. The NMOS transistor 108 may be, for example, a bipolar transistor as long as it is a transistor capable of controlling power.

The resistors 120 and 121 configure a voltage divider circuit that divides the output voltage Vout1, and generate the feedback voltage Vfb that is used in switching the NMOS transistor 108. Note that the feedback voltage Vfb generated at anode at which the resistors 120 and 121 are coupled is applied to the terminal A. Thus, in the power supply circuit 20, the voltage Va at the terminal A results in the feedback voltage Vfb. In this case, the resistors 120 and 121 correspond to the voltage divider circuit 800a illustrated in FIG. 3A.

The resistor 122 functions as a starting resistor upon startup of the power supply circuit 20. The resistor 131 and the capacitors 132 and 133 are elements for phase compensation to stabilize the feedback loop in the power supply circuit 20, and are provided between the terminal B and the ground, to generate the error voltage Ve1.

==Operation of Non-Isolated Power Supply Circuit==

Figure 6:
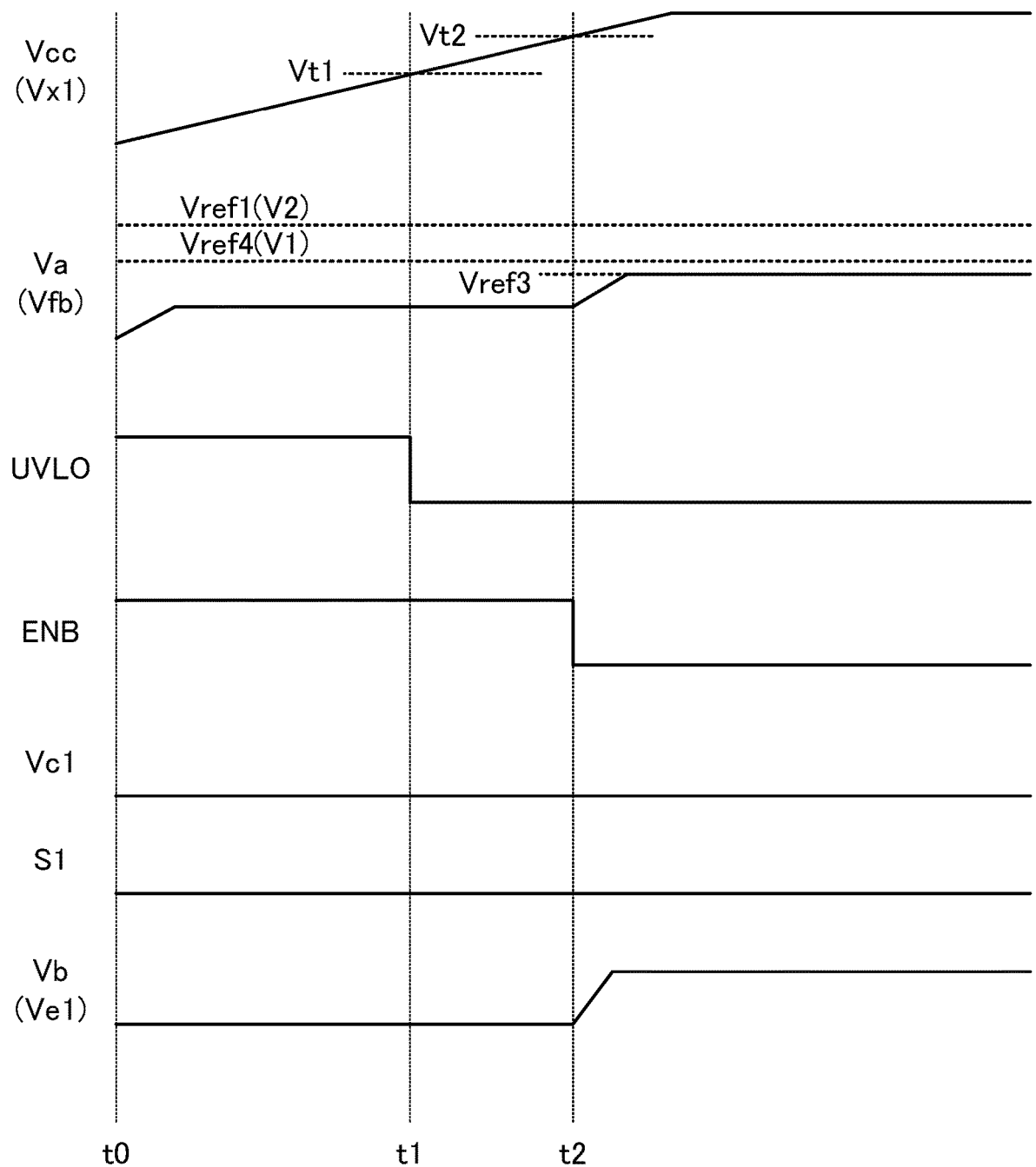
FIG. 6 is a diagram for explaining operation of a power supply circuit 20 at startup.

FIG. 6 is a diagram for explaining operation of the power supply circuit 20 at startup. Note here that the power supply voltage Vcc is the voltage Vx1, and the voltage Va is the feedback voltage Vfb.

Firstly, in response to the AC voltage Vac being supplied to the power supply circuit 20 at time t0, the voltage Vrec1 having been full-wave rectified by the full-wave rectifier circuit 100 is applied to the capacitor 106 through the starting resistor 122. As a result, the charge voltage Vx1 across the capacitor 106 rises, and thus the power supply voltage Vcc (=Vx1) at the terminal VCC rises as well.

Further, in response to the voltage Vrec1 rising, the capacitor 102 is charged through the diode 107, and thus the output voltage Vout1 rises. As a result, the feedback voltage Vfb obtained by dividing the output voltage Vout1 rises as well. Note that, at this time, the output voltage Vout1 does not exceed the effective value of the AC voltage Vac. Accordingly, the feedback voltage Vfb does not exceed a value obtained by dividing the effective value of the AC voltage Vac using the resistors 120 and 121, either. That is, before the switching control IC 10 starts the switching control, the range in which the feedback voltage Vfb varies is from zero to the voltage value obtained by dividing the effective value of the AC voltage Vac using the resistors 120 and 121.

Then, in response to the power supply voltage Vcc (=Vx1) having risen and reached the predetermined level Vt1 at time t1, the voltage detection circuit 31 changes the signal UVLO to low. As a result, reset of the D flip-flop 51 is released.

Moreover, in response to the power supply voltage Vcc (=Vx1) having further risen and reached the predetermined level Vt2 at time t2, the voltage detection circuit 32 changes the signal ENB to low.

Here, the voltage Vref1 of the comparator 50 in the determination circuit 34 is set, for example, to be higher than the value obtained by dividing the effective value of the AC voltage Vac using the resistors 120 and 121. For this reason, at time t2, the D flip-flop 51 holds a low-level comparison result from the comparator 50, and thus the signal S1 is maintained at a low level.

Figure 7:
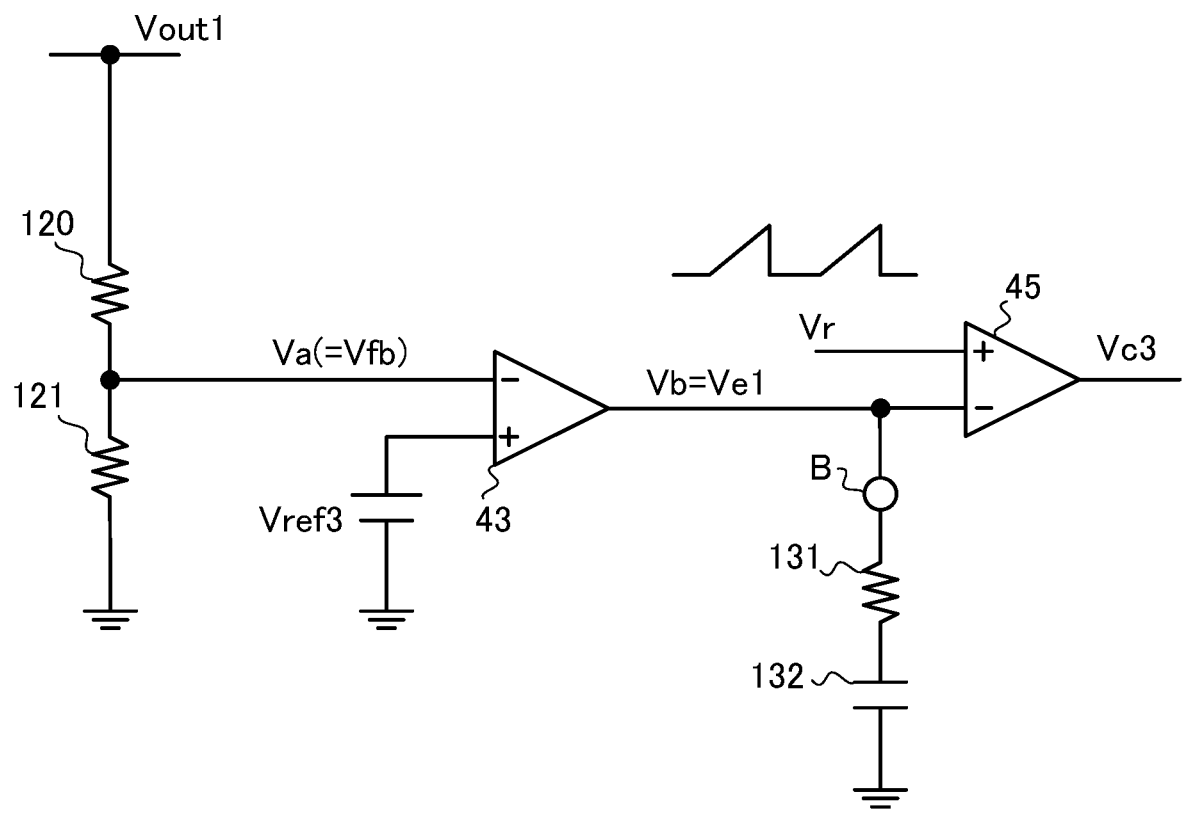
FIG. 7 is a diagram illustrating a configuration of part of a switching control IC 10.

As a result, in the switching control IC 10 in FIG. 1, only the error amplifier circuit 43, out of the error amplifier circuit 43 and the error voltage output circuit 44, operates as illustrated in FIG. 7. Note that the error voltage output circuit 44 is omitted in FIG. 7 for ease of understanding.

Further, when the signal ENB goes low at time t2, circuits in the switching control IC 10 including the error amplifier circuit 43 start operating. As a result, the error amplifier circuit 43 outputs the error voltage Ve1 corresponding to an error between the voltage Va (=Vfb) and the reference voltage Vref3, and the error voltage Ve1 rises. Note that although details will be described later, in the power supply circuit 20, the error amplifier circuit 43 operates such that the level of the feedback voltage Vfb will be equal to the level of the reference voltage Vref3. Thus, from time t2, the voltage Va (=Vfb) rises and reaches the reference voltage Vref3. Further, in this case, since the terminal A is in the first state, the voltage generation circuit 33a generates a voltage Va substantially equal to the feedback voltage Vfb. Note that, for convenience, an embodiment of the present disclosure will be described assuming that the voltage Va is equal to the feedback voltage Vfb when the terminal A is in the first state.

Figure 8:
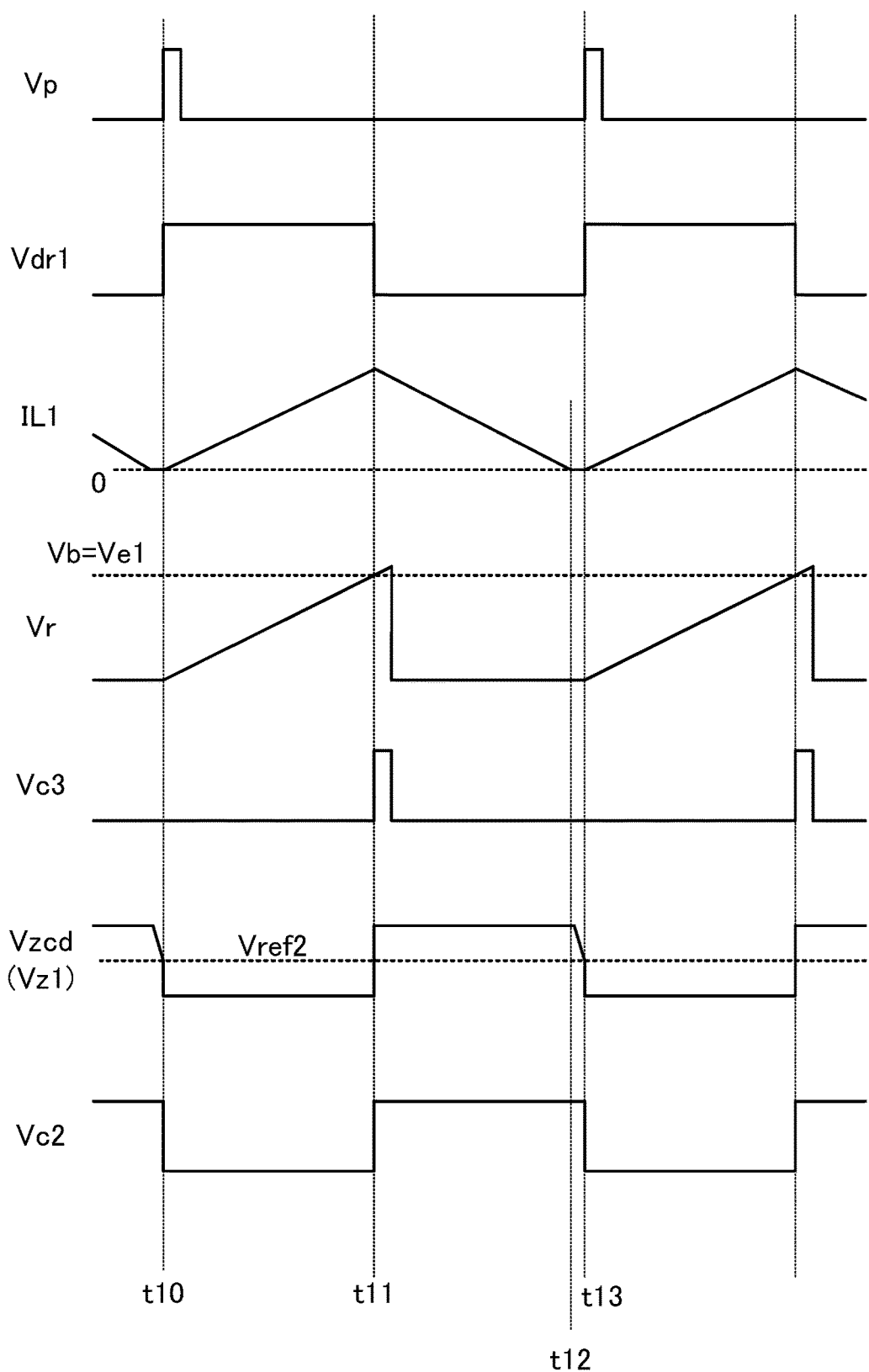
FIG. 8 is a diagram for explaining operation of a power supply circuit 20.

FIG. 8 is a diagram for explaining operation of the power supply circuit 20 after startup. Note that the power supply circuit 20 starts up, for example, in the timing of time t2, at which the signal ENB goes low and circuits in the switching control IC 10 start operating.

Firstly, in response to the pulse signal Vp being outputted at time t10, a drive signal Vdr1 goes high, to thereby turn on the NMOS transistor 108. As a result, the inductor current IL1 increases. Also, in response to the pulse signal Vp being outputted, the amplitude of the ramp wave Vr from the oscillator circuit 42 increases.

Then, in response to the amplitude level of the ramp wave Vr exceeding the level of the voltage Vb (=Ve1) at time t11, the comparator 45 changes the signal Vc3 to high. As a result, the SR flip-flop 70 is reset, and the signal Vdr1 goes low.

In response to the signal Vdr1 going low, the NMOS transistor 108 is turned off, and thus the inductor current IL1 gradually decreases. Further, in response to turning off of the NMOS transistor 108, the voltage of the main coil L1 on the input side (the voltage Vrec1 side) drops below the voltage of the main coil L1 on the output side (the output voltage Vout1 side). Thus, the polarity of the voltage Vz1 at one end of the auxiliary coil L2 having the other end grounded, becomes positive. As a result, the voltage Vzcd (=Vz1) exceeds the reference voltage Vref2, and thus the signal Vc2 from the comparator 40 goes high.

Then, when the inductor current IL1 becomes substantially zero at time t12, the voltage Vz1 across the auxiliary coil L2 magnetically coupled to the main coil L1 starts dropping rapidly. As a result, at time t13, the voltage Vz1 drops below the reference voltage Vref2, and thus the signal Vc2 from the comparator 40 goes low.

In response to the signal Vc2 from the comparator 40 going low, the pulse signal Vp is outputted, to thereby turn on the NMOS transistor 108. Then, from time t13, the operation from time t10 to time t13 is repeated.

==Feedback Control and Power Factor Improvement==

Here, in the power supply circuit 20, in response to the output voltage Vout1 rising from the target level Vo1 (e.g., 400 V), the feedback voltage Vfb rises. As a result, the error voltage Ve1 drops and the time period during which the NMOS transistor 108 is on decreases. Accordingly, the output voltage Vout1 drops. On the other hand, in response to the output voltage Vout1 dropping from the target level Vo1, the feedback voltage Vfb drops. As a result, the error voltage Ve1 rises and the time period during which the NMOS transistor 108 is on increases. Accordingly, the output voltage Vout1 rises. As such, in the power supply circuit 20, the output voltage Vout1 is feedback-controlled so as to be at the target level Vo1.

Accordingly, while the power supply circuit 20 generates the output voltage Vout1 of the target level Vo1 from the predetermined AC voltage Vac and supplies power to a constant load, the feedback voltage Vfb is constant. As a result, the error voltage Ve1 outputted from the error amplifier circuit 43 is also constant, and thus the time period during which the NMOS transistor 108 is on (e.g., the time period from time t10 to time t11) is also constant.

Moreover, in response to the level of the voltage Vrec1 obtained by rectifying the AC voltage Vac rising upon turning on of the NMOS transistor 108, the current value of the inductor current IL1 increases as well. This causes the waveform of the peaks of the inductor current IL1 to be equivalent to the waveform of the voltage Vrec1, to thereby improve the power factor. Accordingly, the power supply circuit 20 operates as a power factor correction (PFC) circuit. As such, the switching control IC 10 enables the non-isolated power supply circuit 20 to perform a desired operation.

<<<Example of Isolated Power Supply Circuit>>>

Figure 9:
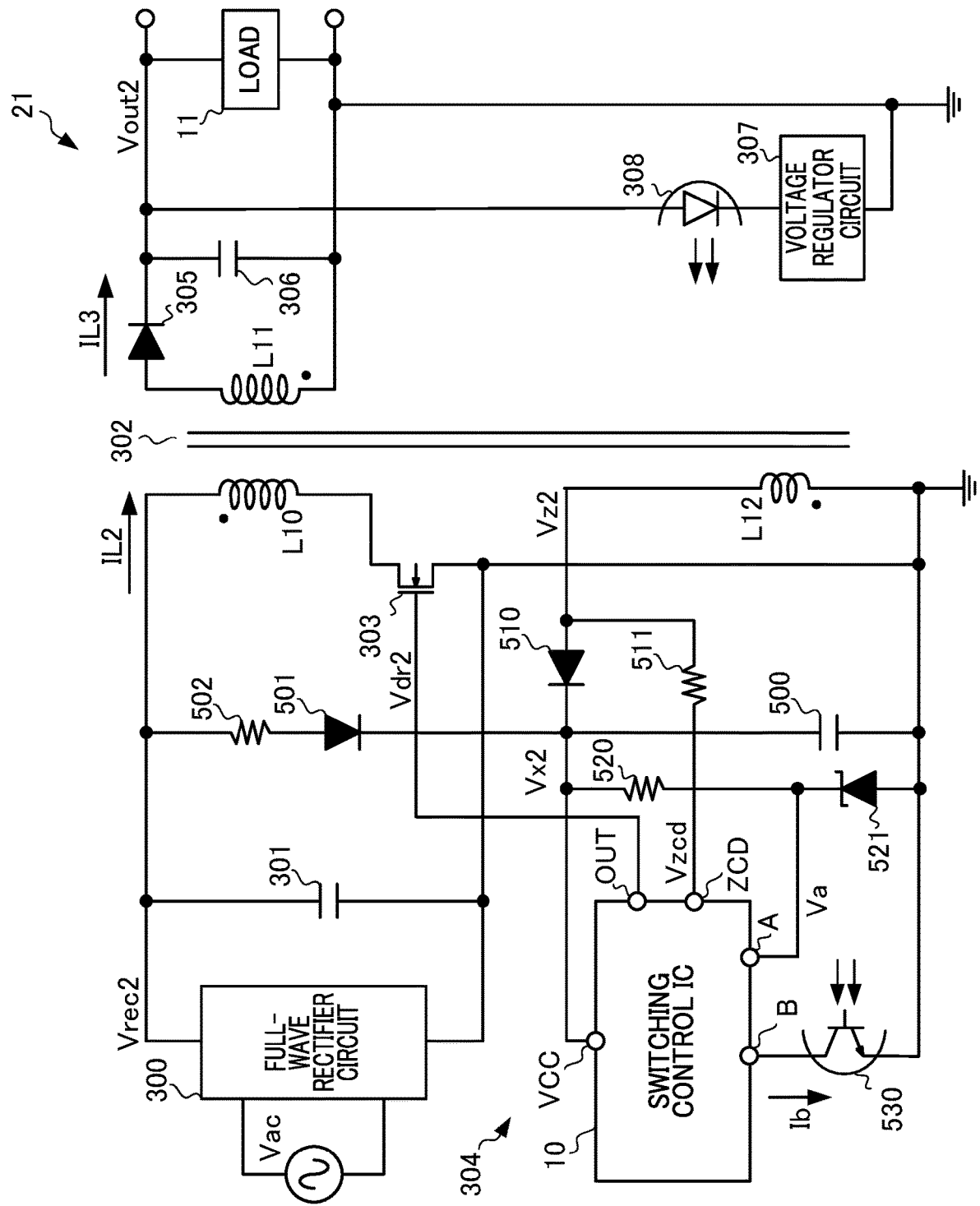
FIG. 9 is a diagram illustrating an example of an isolated power supply circuit 21.

FIG. 9 is a diagram illustrating an example of a configuration of an isolated power supply circuit 21. The power supply circuit 21 is a flyback AC-DC converter that generates an output voltage Vout2 of a target level V2 (e.g., 15 V) at a load 11 from an AC voltage Vac of a commercial power supply. Note that the power supply circuit 21 corresponds to a "second power supply circuit".

The power supply circuit 21 includes a full-wave rectifier circuit 300, capacitors 301 and 306, a transformer 302, an NMOS transistor 303, a control block 304, a diode 305, a voltage regulator circuit 307, and a light emitting diode 308.

The full-wave rectifier circuit 300 full-wave rectifies the predetermined AC voltage Vac applied thereto, and outputs a resultant voltage as a voltage Vrec2 to the capacitor 301.

The capacitor 301 smooths the voltage Vrec2, and thus the smoothed voltage Vrec2 is applied to the transformer 302.

The transformer 302 includes a primary coil L10 (inductor), a secondary coil L11, and an auxiliary coil L12, and the primary coil L10, the secondary coil L11, and the auxiliary coil L12 are insulated from one another. In the transformer 302, a voltage is generated across the secondary coil L11 on a secondary side, according to a variation in the voltage across the primary coil L10 on a primary side, and a voltage is generated across the auxiliary coil L12 on the primary side according to a variation in the voltage across the primary coil L10.

Further, the drain of the NMOS transistor 303 is coupled to one end of the primary coil L10. Thus, the voltage across the secondary coil L11 and the voltage across the auxiliary coil L12 vary in response to switching of the NMOS transistor 303 being started. Note that the primary coil L10 and the secondary coil L11 are electromagnetically coupled with the opposite polarities, and the secondary coil L11 and the auxiliary coil L12 are electromagnetically coupled with the same polarity. Note that the NMOS transistor 303 corresponds to a "power transistor".

The control block 304 is a circuit block to control switching of the NMOS transistor 303. Details will be described later.

The diode 305 rectifies the voltage across the secondary coil L11, and the capacitor 306 smooths the rectified voltage. Thus, a smoothed output voltage Vout2 is generated at the capacitor 306. Note that the output voltage Vout2 is a direct-current voltage (DC voltage) of the target level V2 (e.g., 15 V).

The voltage regulator circuit 307 generates a constant DC voltage, and is configured using a shunt regulator, for example.

The light emitting diode 308 emits light of an intensity corresponding to the difference between the output voltage Vout2 and the output of the voltage regulator circuit 307, and configures a photocoupler together with a phototransistor 530 which will be described later. In an embodiment of the present disclosure, the intensity of the light from the light emitting diode 308 becomes stronger in response to the level of the output voltage Vout2 rising.

<<<Control Block 304>>>

The control block 304 includes a switching control IC 10, a capacitor 500, diodes 501 and 510, resistors 502, 511, and 520, a Zener diode 521, and the phototransistor 530.

The switching control IC 10 is the integrated circuit explained with reference to FIG. 1, and controls switching of the NMOS transistor 303.

One end of the capacitor 500 having the other end grounded, the cathode of the diode 501, and the cathode of the diode 510 are coupled to the terminal VCC. Thus, the capacitor 500 is charged with a current from the diode 501 and a current from the diode 510. A charge voltage Vx2 across the capacitor 500 serves as the power supply voltage Vcc for operating the switching control IC 10. Note that the current from the diode 510 is generated after startup of the switching control IC 10. For this reason, the switching control IC 10 starts up based on the charge voltage Vx2 generated with the current from the diode 501.

The resistor 511 is coupled between the terminal ZCD and the auxiliary coil L12. Thus, a voltage Vz2 generated across the auxiliary coil L12 is applied to the terminal ZCD as the voltage Vzcd. Further, the auxiliary coil L12 generates a voltage of a polarity opposite to that of the primary coil L10, as mentioned above. Thus, the auxiliary coil L12 generates a positive voltage Vz2 when an inductor current IL2 flowing through the primary coil L10 is decreasing, and the auxiliary coil L12 generates a negative voltage Vz2 when the inductor current IL2 flowing through the primary coil L10 is increasing.

One end of the resistor 520 having the other end to receive the charge voltage Vx2, and the cathode of the Zener diode 521 are coupled to the terminal A. Thus, in response to the charge voltage Vx2 sufficiently rising, the voltage Va applied to the terminal A reaches a breakdown voltage Vz0 (e.g., 5.1 V) of the Zener diode 521. In this case, the resistor 520 and the Zener diode 521 correspond to the circuit 800b illustrated in FIG. 3B.

The terminal B is a terminal at which an error voltage indicating an error between the level of the output voltage Vout2 and the target level V2 is generated, and to which the phototransistor 530 is coupled. The phototransistor 530 passes a bias current Ib from the terminal B to the ground. The bias current Ib having a magnitude corresponding to the intensity of the light from the light emitting diode 308. Thus, the phototransistor 530 operates as a transistor that generates a sink current. Note that an element such as a capacitor for removing noise may be provided between the terminal B and the ground.

The gate of the NMOS transistor 303 is coupled to the terminal OUT. Thus, the NMOS transistor 303 is switched in response to a drive signal Vdr2. Note that the power supply circuit 21 corresponds to a "second power supply circuit".

==Operation of Isolated Power Supply Circuit==

Figure 10:
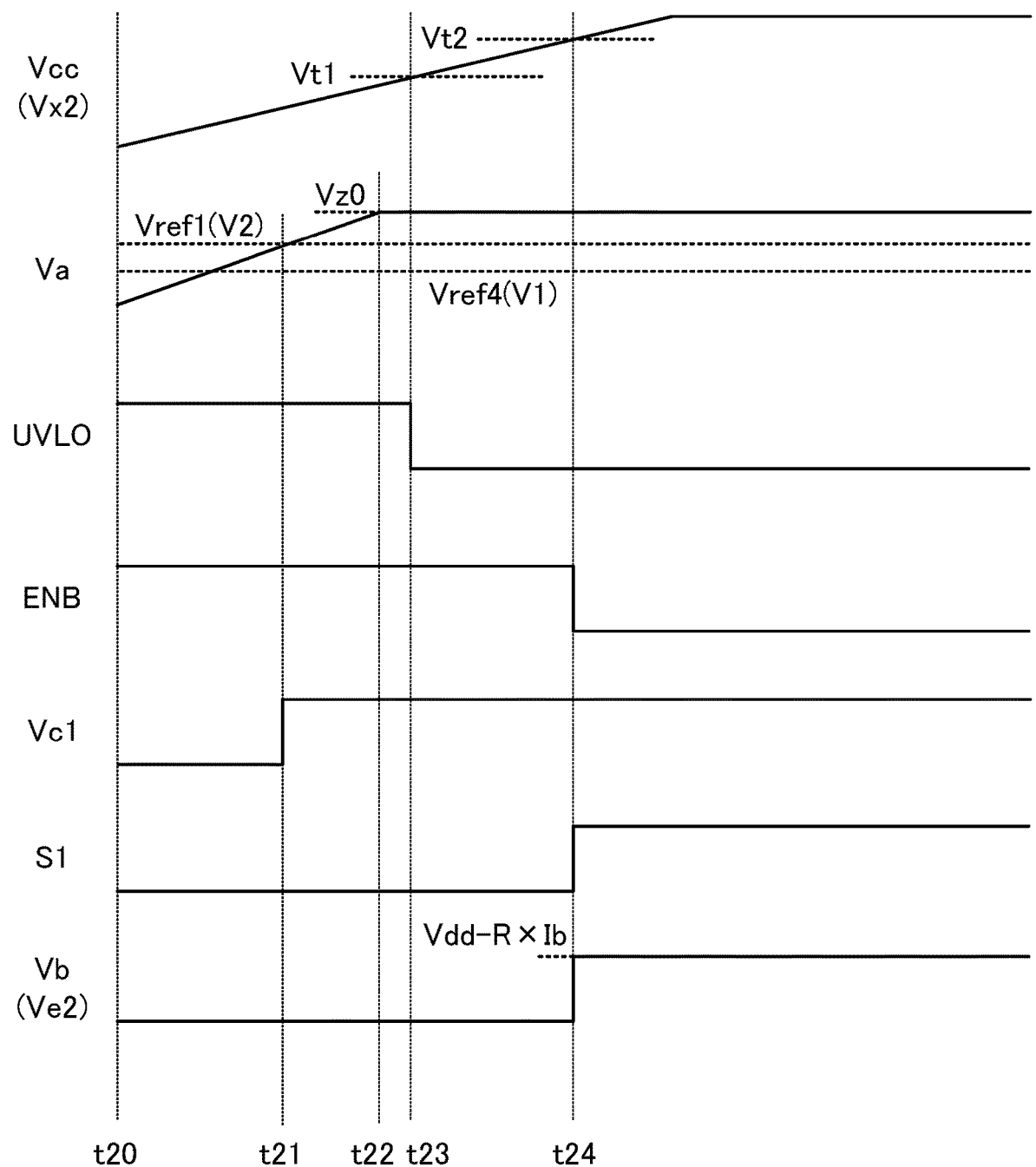
FIG. 10 is a diagram for explaining operation of a power supply circuit 21 at startup.

FIG. 10 is a diagram for explaining operation of the power supply circuit 21 at startup. Here, the power supply voltage Vcc is the voltage Vx2.

Firstly, when the AC voltage Vac is supplied to the power supply circuit 21 and the voltage Vrec2 is generated at time t20, the capacitor 500 is charged through the diode 501. As a result, the charge voltage Vx2 across the capacitor 500 rises, and the power supply voltage Vcc (=Vx2) at the terminal VCC results in rising as well.

Further, in response to the power supply voltage Vcc (=Vx2) rising, the voltage Va rises as well. At time t21, the voltage Va exceeds the reference voltage Vref1 at the comparator 50. As a result, a signal Vc1 from the comparator 50 changes to high. Note that, in an embodiment of the present disclosure, the resistance value of the resistor 520 and the breakdown voltage Vz0 of the Zener diode 521 are selected such that the voltage Va exceeds the reference voltage Vref1 at startup of the power supply circuit 21. Further, as described above, since the terminal A is in the second state, the voltage generation circuit 33a raises the voltage Va above the second level V2 (i.e., reference voltage Vref1).

When the power supply voltage Vcc further rises and the voltage Va exceeds the breakdown voltage Vz0 at time t22, the voltage Va is clamped at the breakdown voltage Vz0. Note that, in an embodiment of the present disclosure, the breakdown voltage Vz0 (e.g., 5.4 V) is a voltage higher than the reference voltage Vref1. Thus, upon turning on of the Zener diode 521, the voltage Va exceeds the reference voltage Vref1 without fail.

Then, in response to the power supply voltage Vcc (=Vx2) having risen and reached the predetermined level Vt1 at time t23, the voltage detection circuit 31 changes the signal UVLO to low. As a result, reset of the D flip-flop 51 is released.

Moreover, in response to the power supply voltage Vcc (=Vx2) having further risen and reached the predetermined level Vt2 at time t24, the voltage detection circuit 32 changes the signal ENB to low. In response to the signal ENB going low, the D flip-flop 51 holds a high-level comparison result from the comparator 50, and thus the level of the signal S1 changes to high.

Figure 11:
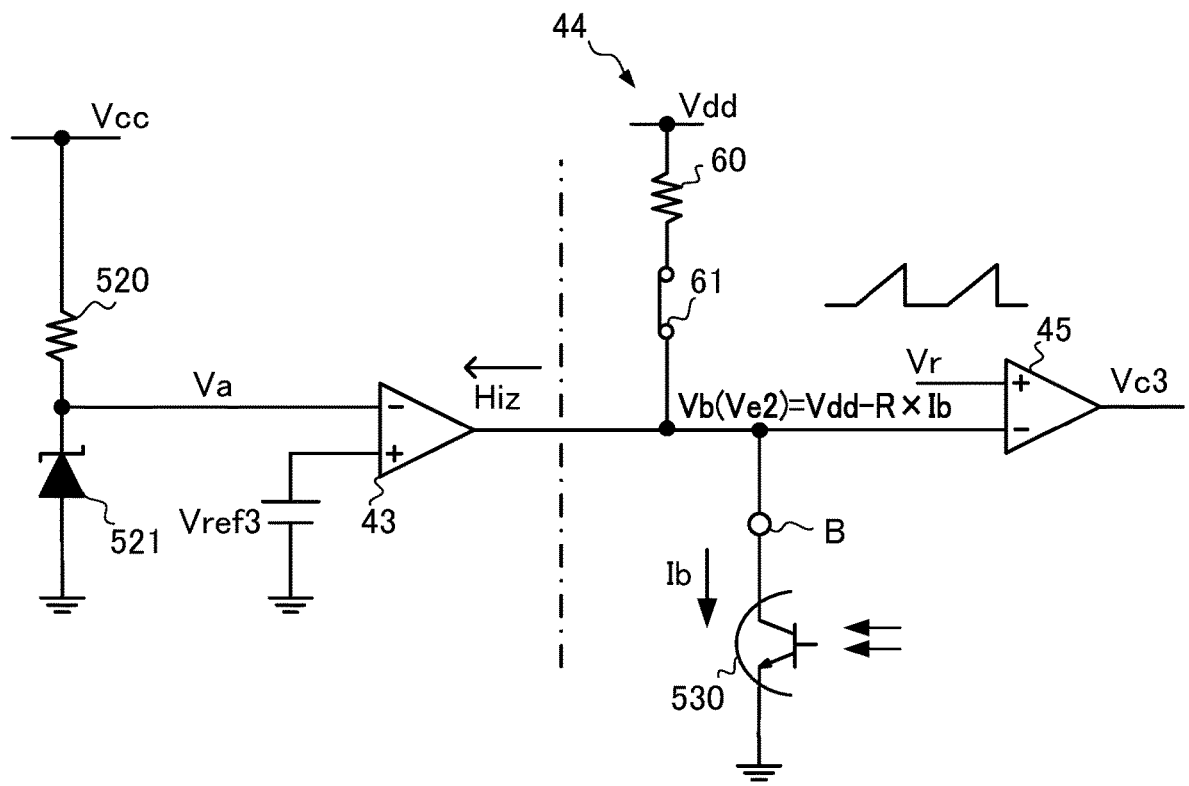
FIG. 11 is a diagram illustrating a configuration of part of a switching control IC 10.

As a result, in the switching control IC 10 in FIG. 1, only the error voltage output circuit 44, out of the error amplifier circuit 43 and the error voltage output circuit 44, operates as illustrated in FIG. 11. Note that the output of the error amplifier circuit 43 is in a high-impedance state. Thus, the output of the error amplifier circuit 43 does not affect the voltage Vb at the terminal B.

Also, in response to the signal ENB going low at time t24, the switch 61 of the error voltage output circuit 44 is turned on, resulting in the error voltage Ve2 from the resistor 60 being Ve2=Vdd−R×Ib, where "R" is the resistance value of the resistor 60, and "Ib" is the current value of the bias current Ib from the phototransistor 530. Further, since the on-resistance value of the switch 61 is sufficiently small, the voltage Vb at the terminal B results in the error voltage Ve2.

Figure 12:
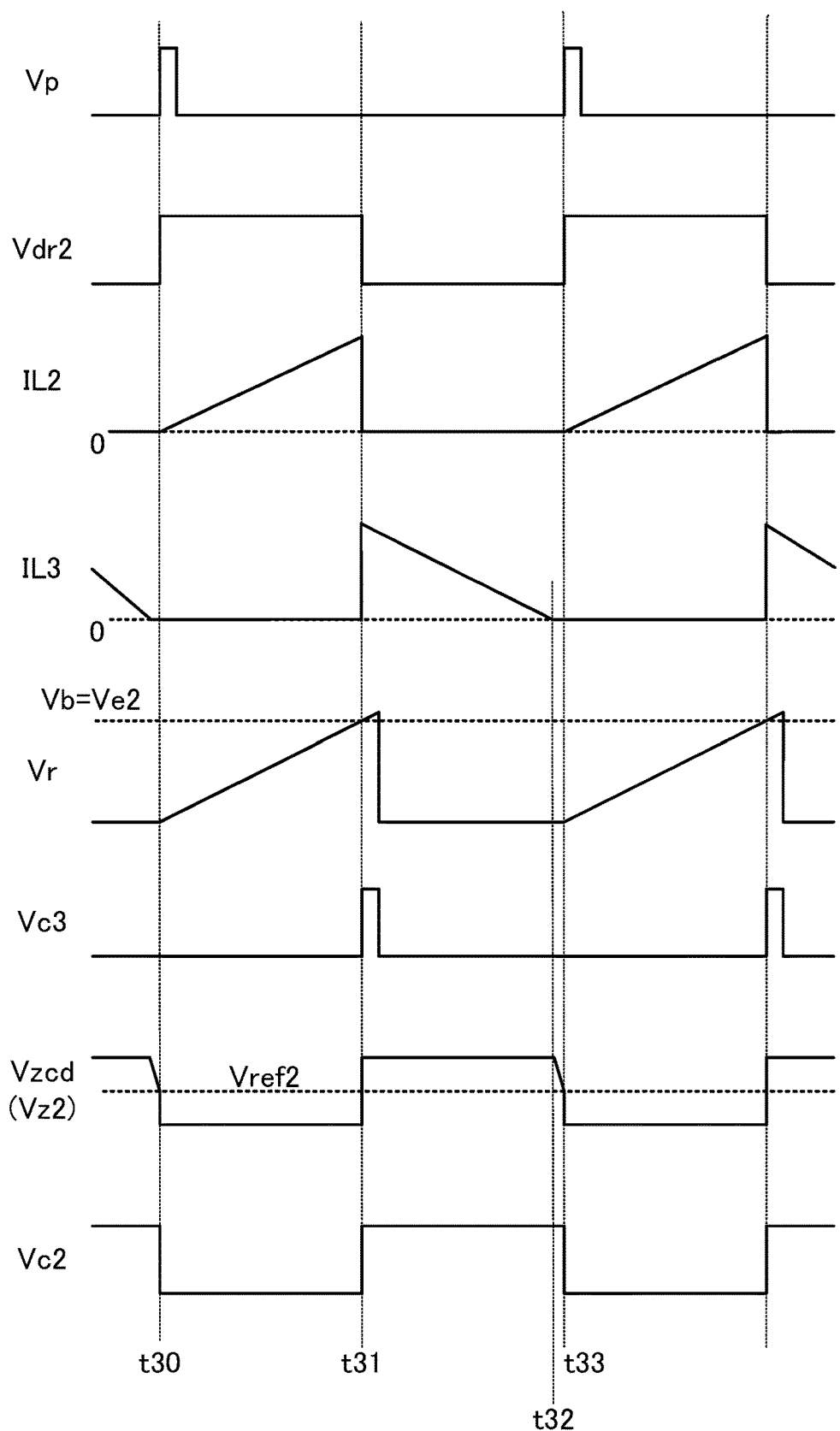
FIG. 12 is a diagram for explaining operation of a power supply circuit 21.

FIG. 12 is a diagram for explaining operation of the power supply circuit 21 after startup. Note that the power supply circuit 21 starts up, for example, in the timing of time t24, at which the signal ENB goes low and circuits in the switching control IC 10 start operating.

Firstly, in response to the pulse signal Vp being outputted at time t30, the drive signal Vdr2 goes high, to thereby turn on the NMOS transistor 303. As a result, the inductor current IL2 increases. In addition, in response to the pulse signal Vp being outputted, the amplitude of the ramp wave Vr from the oscillator circuit 42 increases. Since the secondary coil L11 is electromagnetically coupled with the opposite polarity, the diode 305 is turned off in response to turning on of the NMOS transistor 303, to thereby accumulate energy in the transformer 302.

Then, in response to the amplitude level of the ramp wave Vr exceeding the level of the voltage Vb (=Ve2) at time t31, the comparator 45 changes the signal Vc3 to high. As a result, the SR flip-flop 70 is reset, and the signal Vdr2 goes low as well.

In response to the signal Vdr2 going low, the NMOS transistor 303 is turned off. As a result, the inductor current IL2 rapidly decreases. Accordingly, the polarity of the voltage Vz2 at one end of the auxiliary coil L12 having the other end grounded, becomes positive. Moreover, the energy accumulated in the transformer 302 is outputted from the secondary coil L11 through the diode 305. As a result, the voltage Vzcd (=Vz2) exceeds the reference voltage Vref2, and thus the signal Vc2 from the comparator 40 goes high.

Then, when an inductor current IL3 in the secondary coil L11 becomes substantially zero at time t32, the voltage Vz2 across the auxiliary coil L12 magnetically coupled to the main coil L10 starts dropping rapidly. As a result, at time t33, the voltage Vzcd (=Vz2) drops below the reference voltage Vref2, and the signal Vc2 from the comparator 40 goes low.

In response to the signal Vc2 going low, the pulse signal Vp is outputted, to thereby turn on the NMOS transistor 303. Then, from time t33, the operation from time t30 to time t33 is repeated. Note that the timing at which the inductor current IL3 becomes substantially zero varies with the current value of the inductor current IL2. Accordingly, the switching control IC 10 turns on the NMOS transistor 303 based on the inductor current IL2.

==Feedback Control==

Here, in response to the load 11 becoming a light load, the output voltage Vout2 rises from the target level V2. At this time, the current flowing through the shunt regulator (not illustrated) of the voltage regulator circuit 307 increases, and thus the current flowing through the light emitting diode 308 increases as well. Then, the phototransistor 530 increases the bias current Ib according to the degree of amplification of the light from the light emitting diode 308, and thus the error voltage Ve2 (=Vb) drops. As a result, the time period during which the NMOS transistor 303 is on decreases. Accordingly, the output voltage Vout2 drops.

On the other hand, when the output voltage Vout2 drops from the target level V2, the current from the light emitting diode 308 decreases, contrary to the above. As a result, the bias current Ib decreases and the error voltage Ve2 (=Vb) rises. Accordingly, the time period during which the NMOS transistor 303 is on increases, and thus the output voltage Vout2 rises. As such, in the power supply circuit 21, the output voltage Vout2 is feedback-controlled so as to be at the target level V2. Accordingly, the switching control IC 10 enables the isolated power supply circuit 21 to perform a desired operation.

==Operation of Non-Isolated Power Supply Circuit in Case of Failure in Coupling to Terminal A==

Figure 13:
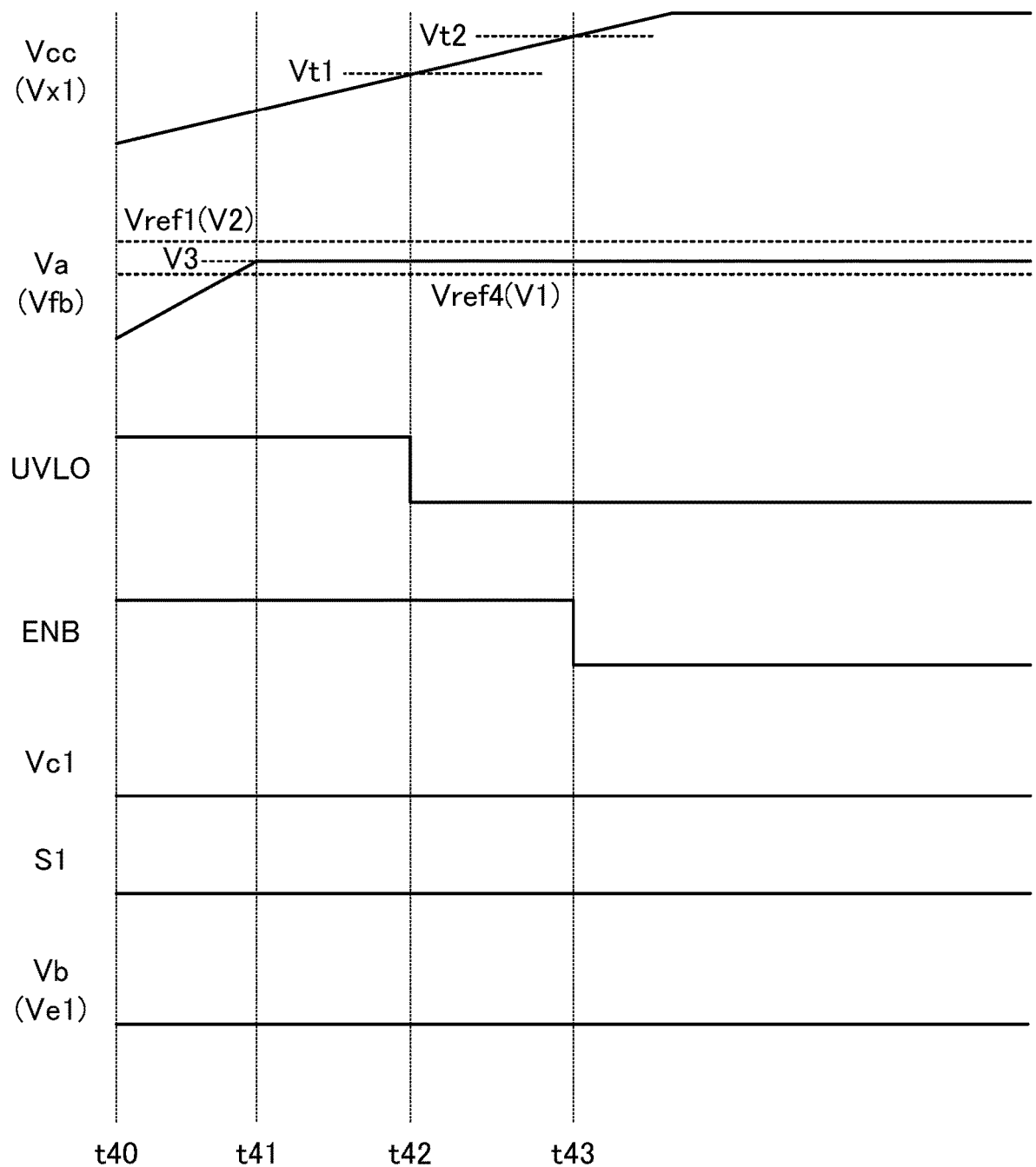
FIG. 13 is a diagram for explaining operation of a power supply circuit 20 at startup when failure in coupling to a terminal A occurs.

FIG. 13 is a diagram for explaining operation of the power supply circuit 20 at startup in case of failure in coupling to the terminal A. Here, the power supply voltage Vcc is the voltage Vx1 mentioned above. Further, "failure in coupling" means, for example, that the external circuit and the terminal A are electrically open with respect to each other (or a state in which the impedance is very large) without the external circuit being electrically coupled to the terminal A.

Firstly, in response to the AC voltage Vac being supplied to the power supply circuit 20 at time t40, the voltage Vrec1 full-wave rectified by the full-wave rectifier circuit 100 is applied to the capacitor 106 through the starting resistor 122. As a result, the charge voltage Vx1 across the capacitor 106 rises, and thus the power supply voltage Vcc (=Vx1) at the terminal VCC rises as well.

Further, in response to the voltage Vrec1 rising, the capacitor 102 is charged through the diode 107, and thus the output voltage Vout1 rises. However, since the feedback voltage Vfb is not applied to the terminal A, the voltage Va rises according to the constant current I0a. Note that, at this time, the output voltage Vout1 does not exceed the effective value of the AC voltage Vac.

Further, in an embodiment of the present disclosure, at time t41, the PMOS transistor 92 of the voltage generation circuit 33a adjusts the voltage Va to a voltage of a third level V3 based on the constant current I0a as described above. And, the voltage generation circuit 33a causes the level of the voltage Va to be at a level higher than the voltage Vref4 of the first level V1 and lower than the voltage Vref1 of the second level V2. Accordingly, at time t41, the comparator 50 outputs a low signal Vc1.

Then, in response to the power supply voltage Vcc (=Vx1) having risen and reached the predetermined level Vt1 at time t42, the voltage detection circuit 31 changes the signal UVLO to low. As a result, reset of the D flip-flop 51 is released.

Moreover, in response to the power supply voltage Vcc (=Vx1) having further risen and reached the predetermined level Vt2 at time t43, the voltage detection circuit 32 changes the signal ENB to low. Here, the voltage Vref1 at the comparator 50 of the determination circuit 34 is set to be higher than the value obtained by dividing the effective value of the AC voltage Vac using the resistors 120 and 121, for example.

Further, in an embodiment of the present disclosure, at this time, the D flip-flop 51 holds the low-level comparison result from the comparator 50, and thus the signal S1 is maintained at a low level. As a result of this, in the switching control IC 10 in FIG. 1, only the error amplifier circuit 43, out of the error amplifier circuit 43 and the error voltage output circuit 44, operates as illustrated in FIG. 7.

Further, in response to the signal ENB going low at time t43, circuits in the switching control IC 10 including the error amplifier circuit 43 start operating. However, since the voltage Va is higher than the reference voltage Vref4, the comparator 46 outputs the high signal Vc4, and thus the switching of the NMOS transistor 108 is stopped. This can prevent breakage of the capacitor 102 and the like, without the output voltage Vout1 in the power supply circuit 20 becoming an overvoltage.

<<Modification of Voltage Generation Circuit>>

Figure 14:
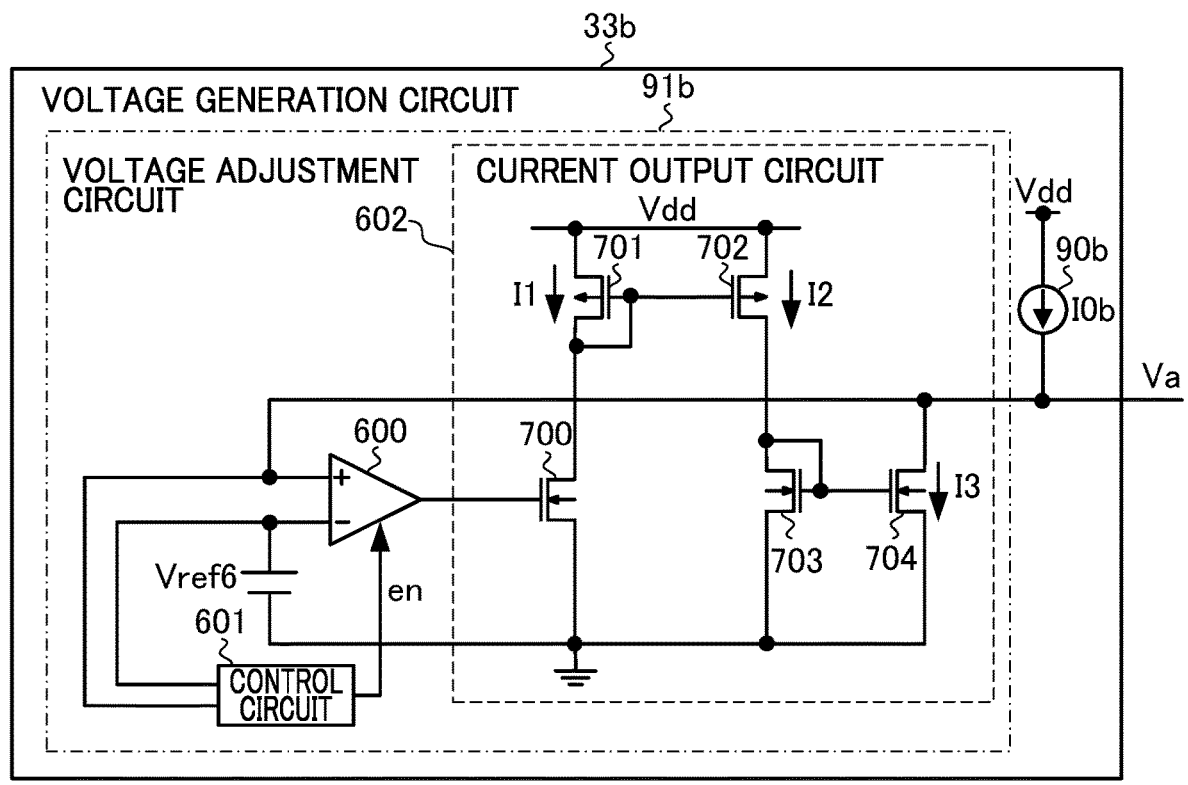
FIG. 14 is a diagram illustrating an example of a voltage generation circuit 33b.

It is assumed that the voltage generation circuit 33a includes the constant current source 90a and the voltage adjustment circuit 91a, but it may be configured as a voltage generation circuit 33b illustrated in FIG. 14. The voltage generation circuit 33b generates the voltage Va according to which state among the first to third states the terminal A is in. Specific operation will be described below along with a description of circuits in the voltage generation circuit 33b. The voltage generation circuit 33b includes a constant current source 90b, an operational amplifier 600, a control circuit 601, and a current output circuit 602.

The constant current source 90b supplies a constant current I0b to the terminal A. The operational amplifier 600 compares the voltage Va and a reference voltage Vref6, to control the on-resistance of an NMOS transistor 700 of the later-described current output circuit 602 according to the magnitude relationship between the voltage Va and the reference voltage Vref6. When the voltage Va is higher than the reference voltage Vref6, the control circuit 601 outputs a signal en to enable the operational amplifier 600. Meanwhile, when the voltage Va is lower than the reference voltage Vref6, the control circuit 601 outputs a signal en to disable the operational amplifier 600. In this case, the operational amplifier 600 outputs a voltage to turn off the NMOS transistor 700. Note that the reference voltage Vref6 is a voltage of the third level V3 higher than a voltage of the first level V1 (i.e., reference voltage Vref4) and lower than a voltage of the second level V2 (i.e., reference voltage Vref1) which are illustrated in FIG. 3C.

The current output circuit 602 generates a current I3 corresponding to the output of the operational amplifier 600, and includes NMOS transistors 700, 703, and 704 and PMOS transistors 701 and 702. Note that although details will be described later, the current I3 is a current that flows through the NMOS transistor 704.

<Case where Circuit Used in Non-Isolated Power Supply Circuit is Coupled Thereto>

Figure 3C:
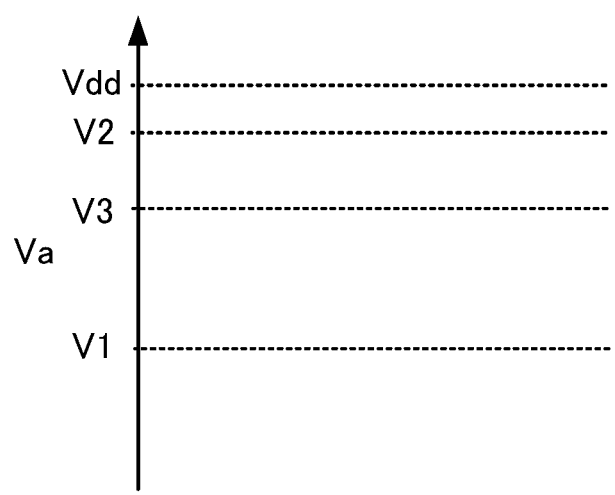

As illustrated in FIGS. 3A and 3C mentioned above, in the first state, in which the voltage divider circuit 800a is coupled to the terminal A, the voltage Va is the first level V1. Thus, in this case, the voltage Va is lower than the reference voltage Vref6, and thus the control circuit 601 disables the operational amplifier 600, to thereby turn off the NMOS transistor 700. Moreover, a current I1 of the diode-coupled PMOS transistor 701 does not flow, and thus a current I2 of the PMOS transistor 702, which configures a current mirror circuit with the PMOS transistor 701, does not flow either. The current I2 is passed through the diode-coupled NMOS transistor 703. For this reason, when the current I2 does not flow, the current I3 of the NMOS transistor 704, which configures a current mirror circuit with the NMOS transistor 703, does not flow either.

Accordingly, when the terminal A is in the first state, the current output circuit 602 does not drive the terminal A with the current I3. Consequently, the voltage generation circuit 33b generates a voltage Va being a divided voltage. Here, the constant current I0b from the constant current source 90b flows to the ground through the resistor 121. As with the constant current I0a, the constant current I0b is set at such a very small value (e.g., 2 µA) that the voltage Va at the terminal A does not substantially change even when the constant current I0b flows to the outside. That is, when the voltage divider circuit 800a used in a non-isolated power supply circuit is coupled to the terminal A, the voltage generation circuit 33b causes the level of the voltage Va at the terminal A to be at substantially the level of the feedback voltage Vfb.

<Case where Circuit Used in Isolated Power Supply Circuit is Coupled Thereto>

In addition, as illustrated in FIGS. 3B and 3C mentioned above, in the second state, in which the circuit 800b is coupled to the terminal A, the Zener diode 521 of the circuit 800b applies the breakdown voltage Vz0 to the terminal A. Here, the level of the reference voltage Vref6 in an embodiment of the present disclosure is set below the level of the breakdown voltage Vz0. Thus, the control circuit 601 enables the operational amplifier 600. Moreover, in this case, the voltage level at the non-inverting input terminal of the operational amplifier 600 is higher than the voltage level at the inverting input terminal thereof, and thus the operational amplifier 600 lowers the on-resistance of the NMOS transistor 700. As a result, the current I1 increases and the current I2 increases as well. Further, in response to the current I2 increasing, the current I3 increases as well.

However, in an embodiment of the present disclosure, the maximum value of the current I3 is set below the current Ia from the resistor 520 illustrated in FIG. 3B. Accordingly, a voltage adjustment circuit 91b cannot cause the level of the voltage Va to be at the level of the reference voltage Vref6 through feedback control, and the voltage Va rises to be a voltage higher than the second level V2 (e.g., voltage Vdd). That is, in this case, the voltage generation circuit 33b causes the level of the voltage Va at the terminal A to be at a voltage higher than the second level.

<Case where Circuit Used in Power Supply Circuit is not Coupled Thereto>

The third state, in which the terminal A and the circuit supposed to be coupled to the terminal A are open with respect to each other, will be described. Even when the voltage Va is lower than the reference voltage Vref6, the operational amplifier 600 is disabled, and the NMOS transistor 704 is turned off, the constant current source 90b generates the current I0b, and thus, the voltage Va exceeds the reference voltage Vref6. As a result, the operational amplifier 600 operates. Moreover, in an embodiment of the present disclosure, the current I0b is set below the maximum value of the current I3. Thus, the operational amplifier 600 can cause the level of the voltage Va to be at the level of the reference voltage Vref6. That is, the voltage generation circuit 33b generates a voltage Va being the reference voltage Vref6 (i.e., voltage of the third level V3) when the terminal A is in the third state. This makes it possible to prevent the determination circuit 34 from erroneously determining that the terminal A is in the second state when the terminal A is in the third state.

===Summary===

The switching control IC 10 according to an embodiment of the present disclosure has been described above. The switching control IC 10 includes the terminal A, the voltage generation circuit 33a, the determination circuit 34, and the driver circuit 48. The voltage generation circuit 33a generates, at the terminal A, a voltage of the third level V3 higher than the first level V1 and lower than the second level V2, when the terminal A is in the third state. Accordingly, the determination circuit 34 can determine that the switching control IC 10 is used in the power supply circuit 20, even if the terminal A is in the third state when the switching control IC 10 is used in the power supply circuit 20. This makes it possible to provide an integrated circuit capable of properly determining the type of a power supply circuit.

In addition, the voltage generation circuit 33a includes the constant current source 90a and the voltage adjustment circuit 91a. The constant current source 90a supplies the constant current I0a. This enables the voltage adjustment circuit 91a to detect that the terminal A is in the third state and adjust the voltage Va based on the constant current I0a.

In addition, the voltage generation circuit 33a includes the PMOS transistor 92. The PMOS transistor 92 generates, at the terminal A, a voltage of the third level V3 higher than the first level V1 and lower than the second level V2 based on the constant current I0a, when the terminal A is in the third state. This enables the determination circuit 34 can determine that the switching control IC 10 is used in the power supply circuit 20 when the terminal A is in the third state.

In addition, the PMOS transistor 92 is off when the terminal A is in the first state, and is on when the terminal A is in the second state or the third state. This enables the determination circuit 34 to properly determine whether the switching control IC 10 is used in the power supply circuit 20 or 21, as long as the terminal A is not in the third state.

In addition, the voltage divider circuit 800a is a voltage divider circuit that generates, at the terminal A, the feedback voltage Vfb corresponding to the output voltage Vout1, and the circuit 800b includes an element that generates the breakdown voltage Vz0 at the terminal A. This enables the voltage generation circuit 33a to generate the voltage Va to properly determine the type of the power supply circuit when the terminal A is in the first state or the second state. Also, the voltage generation circuit 33a can generate a voltage of the third level V3 as the voltage Va when the terminal A is in the third state. And, the determination circuit 34 can properly determine the type of the power supply circuit.

In addition, the switching control IC 10 includes the comparator 46. The comparator 46 causes the driver circuit 48 to stop driving the NMOS transistor 108 in response to the voltage Va reaching a voltage of the first level V1. Specifically, when the terminal A is in the third state, the voltage Va is higher than a voltage of the first level V1, and thus the driver circuit 48 does not drive the NMOS transistor 108. Accordingly, in the switching control IC 10, the output voltage Vout1 of the power supply circuit 20 does not become an overvoltage due to driving of the NMOS transistor 108, even if the terminal A is in the third state.

In addition, the switching control IC 10 includes the error amplifier circuit 43 and the error voltage output circuit 44. This enables the switching control IC 10 to cause the power supply circuit 20 or 21 to generate the output voltage Vout1 or Vout2 from the input voltage Vac by switching the NMOS transistor 108 or 303, regardless of whether the switching control IC 10 is used in the power supply circuit 20 or 21.

In addition, the switching control IC 10 includes the terminal B. This enables the power supply circuit 20 or 21 to generate the output voltage Vout1 or Vout2 of the target level based on the voltage generated at the terminal B, regardless of whether the switching control IC 10 is used in the power supply circuit 20 or 21.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

For example, in the power supply circuit 21, in order to generate the voltage Va, the resistor 520 and the Zener diode 521 are used to set a voltage Va outside the range in which the feedback voltage varies. However, the present disclosure is not limited thereto. Specifically, for example, a resistor may be used in place of the Zener diode 521 to divide the voltage Vx2 using the two resistors, and the divided voltage may be used as the voltage Va.

In addition, as described above, at startup of the power supply circuit 20, the feedback voltage Vfb is a value obtained by dividing the effective value of the AC voltage Vac using the resistors 120 and 121. Thus, in the power supply circuit 21, an element that outputs a voltage value smaller than the value obtained by dividing the effective value of the AC voltage Vac using the resistors 120 and 121 (e.g., 0.7 V, which is the forward voltage of a diode) may be used to generate the voltage Va. In such a case, the reference voltage Vref1 may be set between the value obtained by dividing the effective value of the AC voltage Vac using the resistors 120 and 121 and 0.7 V, which is the forward voltage of a diode, to thereby enable the determination circuit 34 to determine whether the power supply circuit is of a non-isolated type or an isolated type.

For example, in the error voltage output circuit 44, a MOS transistor that operates in a linear region may be used in place of the resistor 60.

In addition, the switching control IC 10 operates in a mode in which a transistor is turned on in response to the inductor current IL becoming zero (a so-called critical mode), but may be, for example, a circuit that operates in a mode in which the inductor current IL continuously varies (a so-called continuous mode).

In addition, the power supply circuit 21 is a flyback power supply circuit, but is not limited thereto. For example, the power supply circuit 21 may be of a forward type, a push-pull type, a half-bridge type, a full-bridge type, or a chopper type.

The present disclosure is directed to provision of an integrated circuit capable of properly determining the type of a power supply circuit.

According to the present disclosure, it is possible to provide an integrated circuit capable of properly determining the type of a power supply circuit.

What is claimed is:
1. An integrated circuit for a power supply circuit that generates an output voltage from an input voltage inputted thereto, the power supply circuit being of a non-isolated type or an isolated type, the power supply circuit including
    an inductor configured to receive the input voltage,
    a power transistor configured to control an inductor current flowing through the inductor, and
    a state-indicating circuit that generates an output to indicate whether the power supply circuit is of the non-isolated type or the isolated type, the state-indicating circuit being
        a first circuit when the power supply circuit is of the non-isolated type, and
        a second circuit when the power supply circuit is of the isolated type,
the integrated circuit being configured to switch the power transistor, based on the inductor current and the output voltage, the integrated circuit comprising:
    a first terminal configured to be coupled to the state-indicating circuit, a state of the first terminal being
        a first state when the state-indicating circuit coupled to the first terminal is the first circuit, and
        a second state when the state-indicating circuit coupled to the first terminal is the second circuit, and
        a third state when no state-indicating circuit is coupled to the first terminal;
    a voltage generation circuit configured to generate, at the first terminal, a voltage that is
        lower than a first level in correspondence to the output voltage, when the first terminal is in the first state, higher than a second level, when the first terminal is in the second state, and higher than the first level and lower than the second level, when the first terminal is in the third state;

a determination circuit configured to determine that the power supply circuit is of the non-isolated type, when the voltage at the first terminal is lower than the second level, and determine that the power supply circuit is of the isolated type, when the voltage at the first terminal is higher than the second level; and a driver circuit configured to drive the power transistor in response to a result of determination of the determination circuit.

2. The integrated circuit according to claim 1, wherein the voltage generation circuit includes a constant current source configured to supply a constant current to the first terminal, and a voltage adjustment circuit configured to adjust the voltage at the first terminal, based on the state of the first terminal and the constant current supplied to the first terminal.

3. The integrated circuit according to claim 2, wherein the voltage adjustment circuit includes a transistor configured to generate, at the first terminal, the voltage that is higher than the first level and lower than the second level, based on the constant current, when the first terminal is in the third state.

4. The integrated circuit according to claim 3, wherein the transistor is off when the first terminal is in the first state, and is on when the first terminal is in the second state or the third state.

5. The integrated circuit according to claim 1, wherein the first circuit is a voltage divider circuit configured to generate, at the first terminal, a feedback voltage corresponding to the output voltage, and the second circuit configured to generate a predetermined voltage at the first terminal.

6. The integrated circuit according to claim 1, further comprising a protection circuit configured to, when the power supply circuit is of the non-isolated type, cause the driver circuit to stop driving the power transistor, in response to the voltage at the first terminal reaching the first level.

7. The integrated circuit according to claim 1, further comprising:

a first error voltage output circuit configured to output a first error voltage for causing a level of the output voltage to be at a first target level, when the power supply circuit is of the non-isolated type; and a second error voltage output circuit configured to output a second error voltage for causing the level of the output voltage to be at a second target level, when the power supply circuit is of the isolated type, wherein the driver circuit drives the power transistor based on the first error voltage, when the power supply circuit is of the non-isolated type, and drives the power transistor based on the second error voltage, when the power supply circuit is of the isolated type.

8. The integrated circuit according to claim 7, wherein the power supply circuit further includes a capacitor when the power supply circuit is of the non-isolated type, and a phototransistor when the power supply circuit is of the isolated type; and the integrated circuit further includes a second terminal configured to be coupled to the capacitor when the power supply circuit is of the non-isolated type, and to the phototransistor when the power supply circuit is of the isolated type, wherein the first error voltage output circuit generates the first error voltage at the capacitor, and the second error voltage output circuit generates the second error voltage according to a current from the phototransistor.

\* \* \* \* \*